Jan. 22, 1935.  C. D. KNOWLTON  1,988,451
BLANK MAKING
Filed Sept. 8, 1930  21 Sheets-Sheet 1

INVENTOR
Cutler D. Knowlton

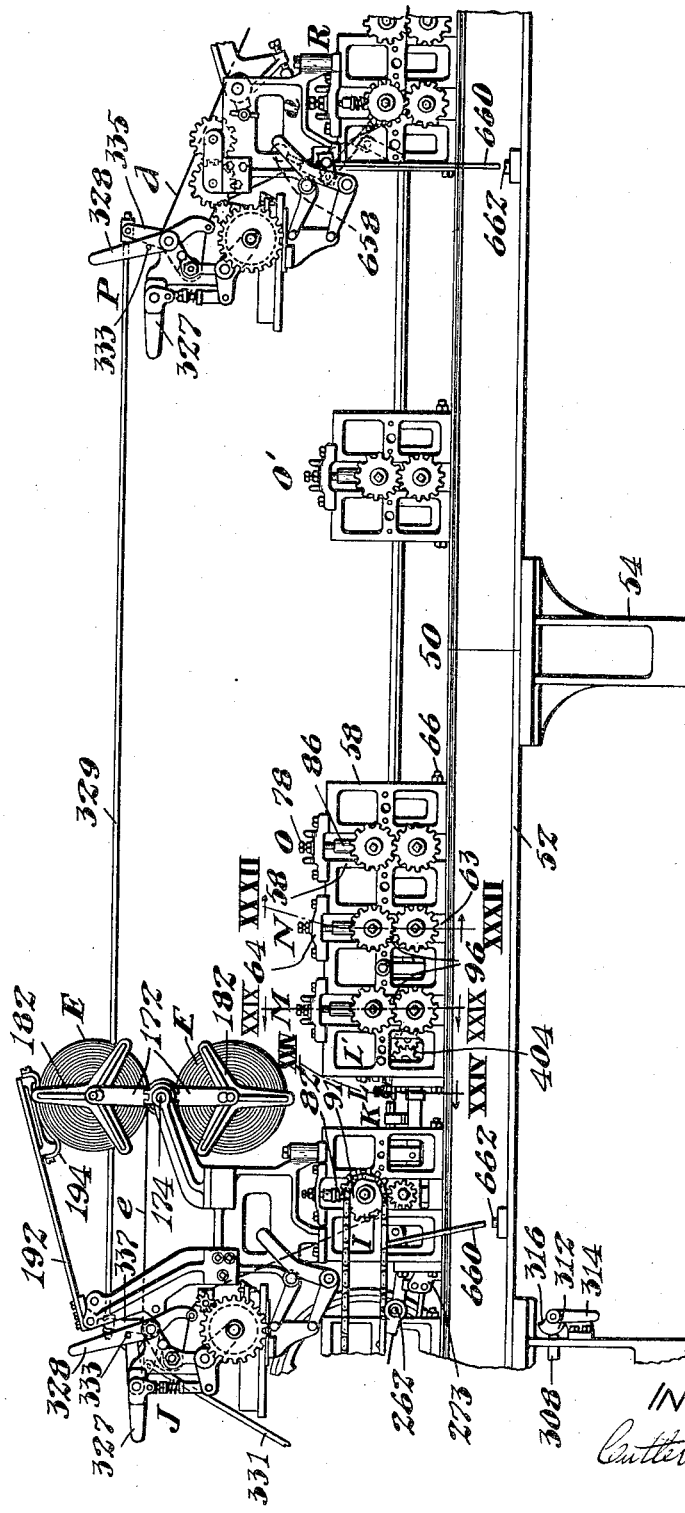

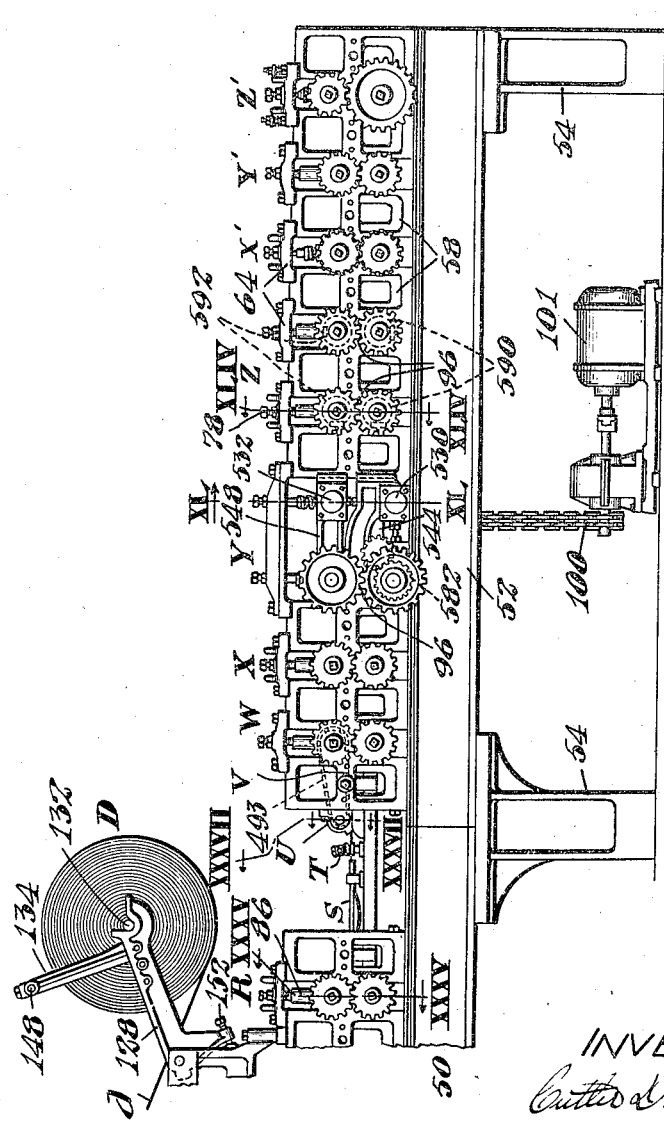

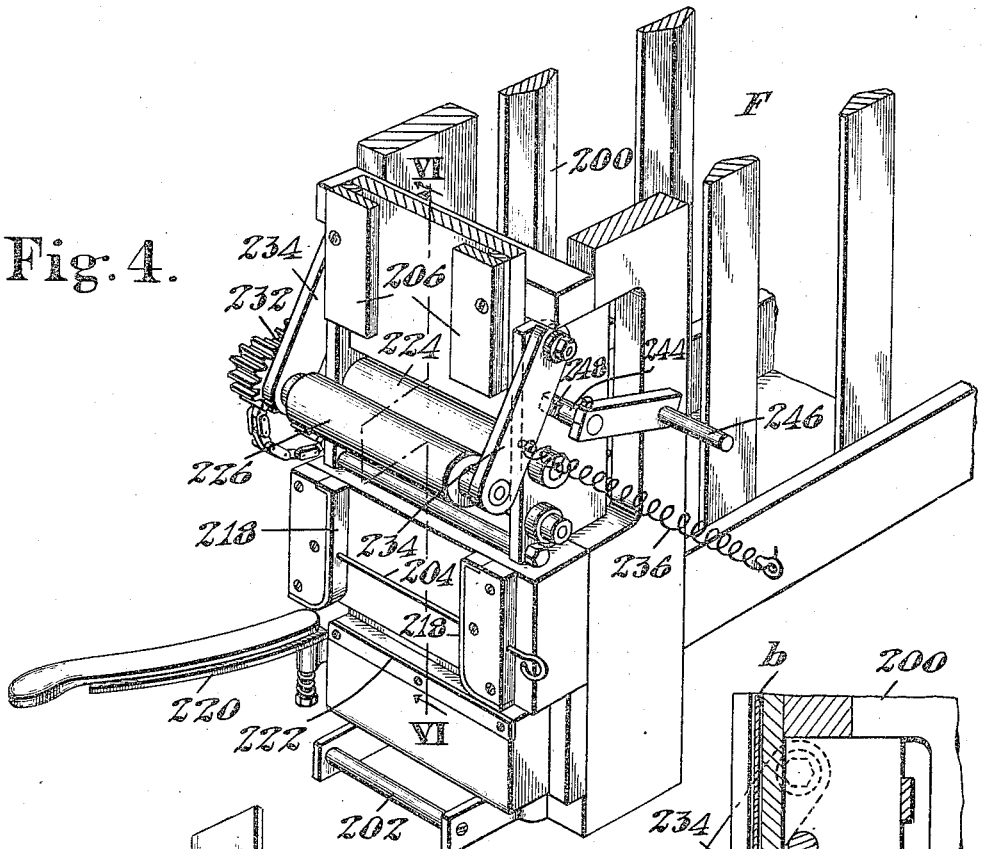
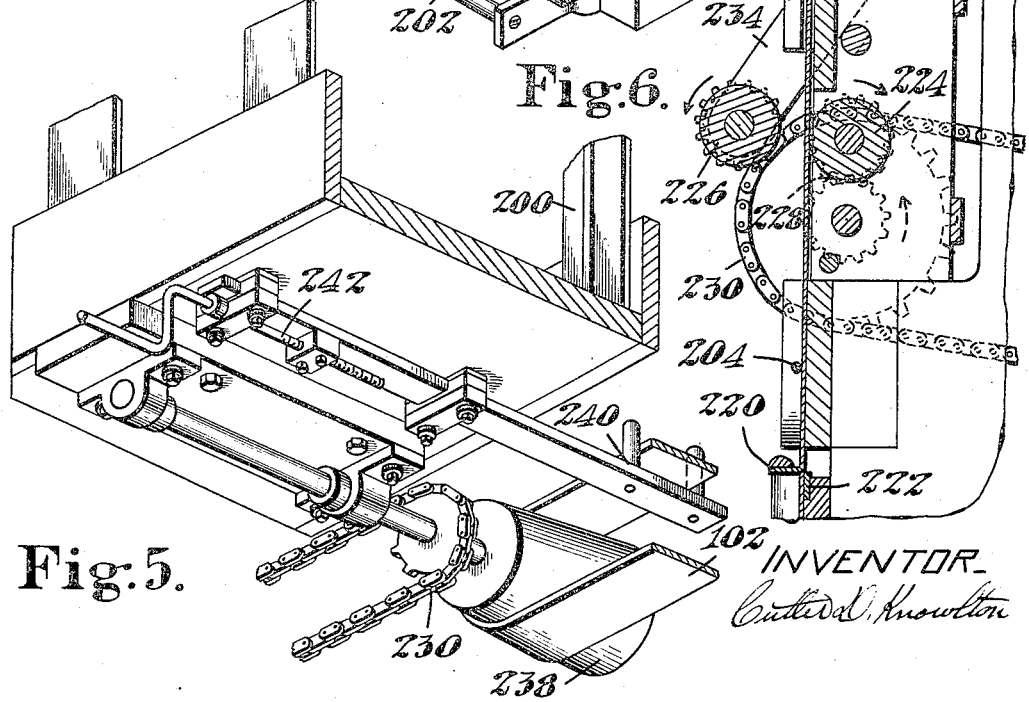

Jan. 22, 1935.  C. D. KNOWLTON  1,988,451
BLANK MAKING
Filed Sept. 8, 1930   21 Sheets-Sheet 5

INVENTOR
Cutler D. Knowlton

Jan. 22, 1935.　　　C. D. KNOWLTON　　　1,988,451
BLANK MAKING
Filed Sept. 8, 1930　　21 Sheets-Sheet 6

INVENTOR
Cutler D. Knowlton

Jan. 22, 1935.     C. D. KNOWLTON     1,988,451

BLANK MAKING

Filed Sept. 8, 1930     21 Sheets-Sheet 7

INVENTOR
Cutler D. Knowlton

INVENTOR.
Cutter D. Knowlton

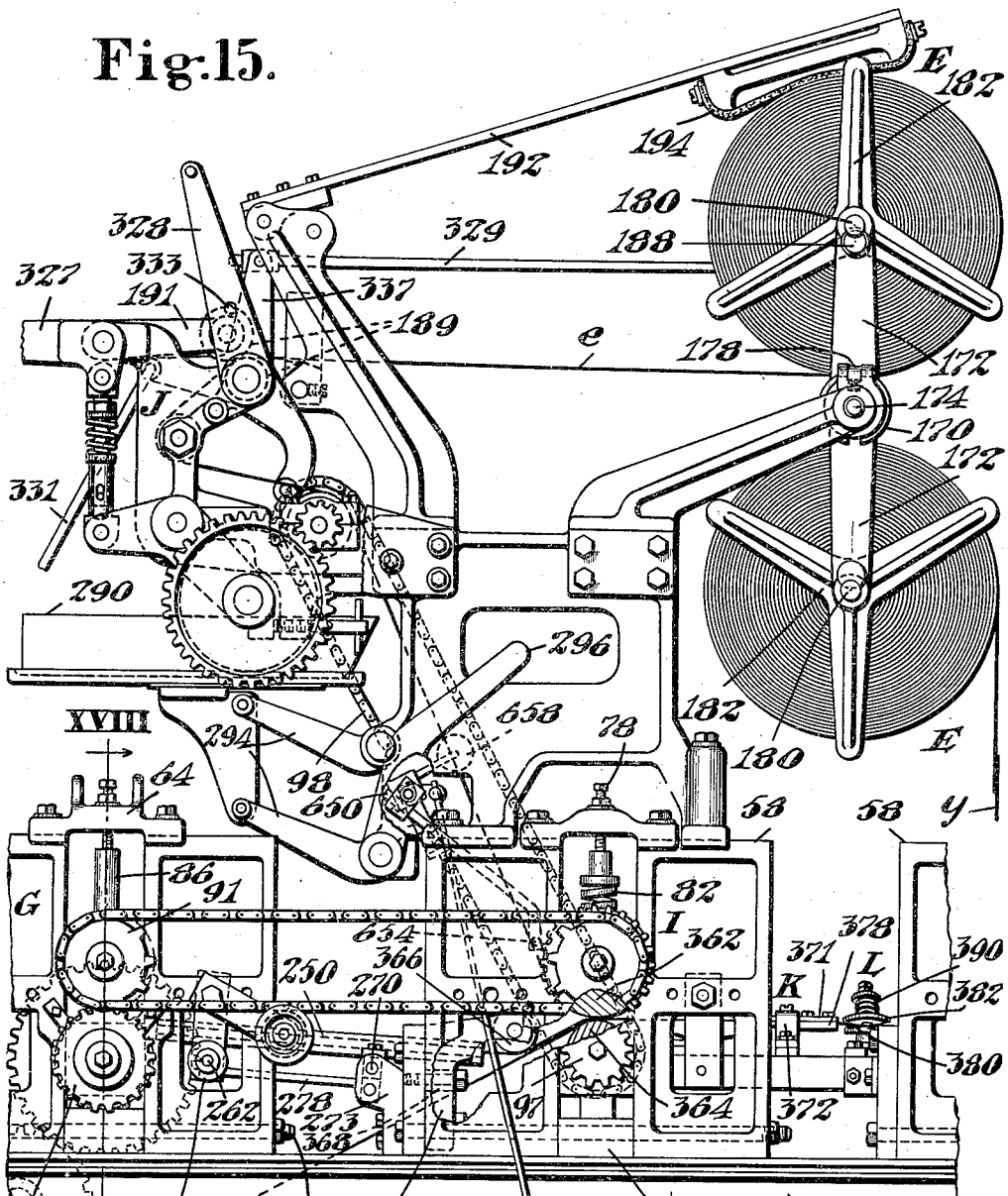

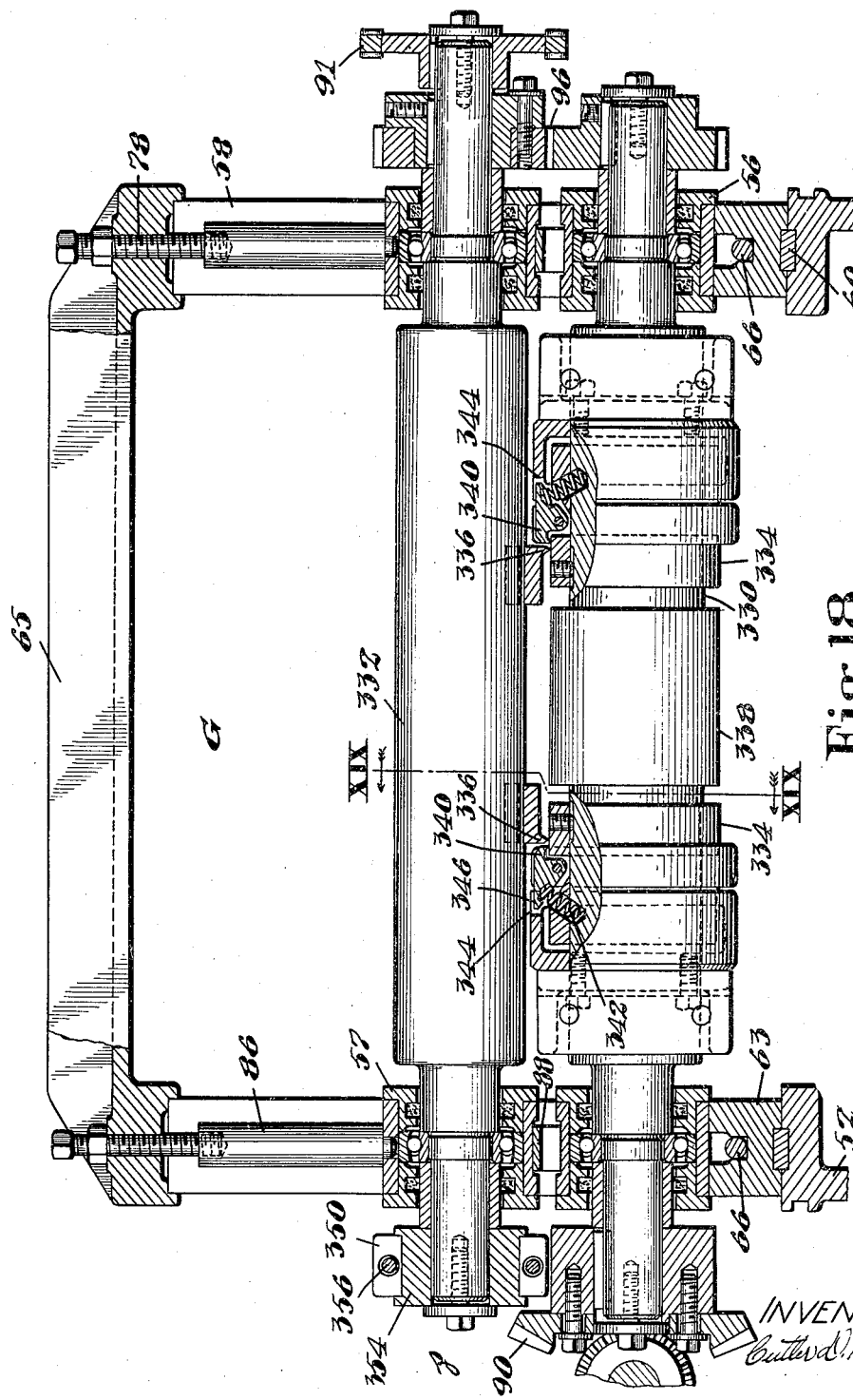

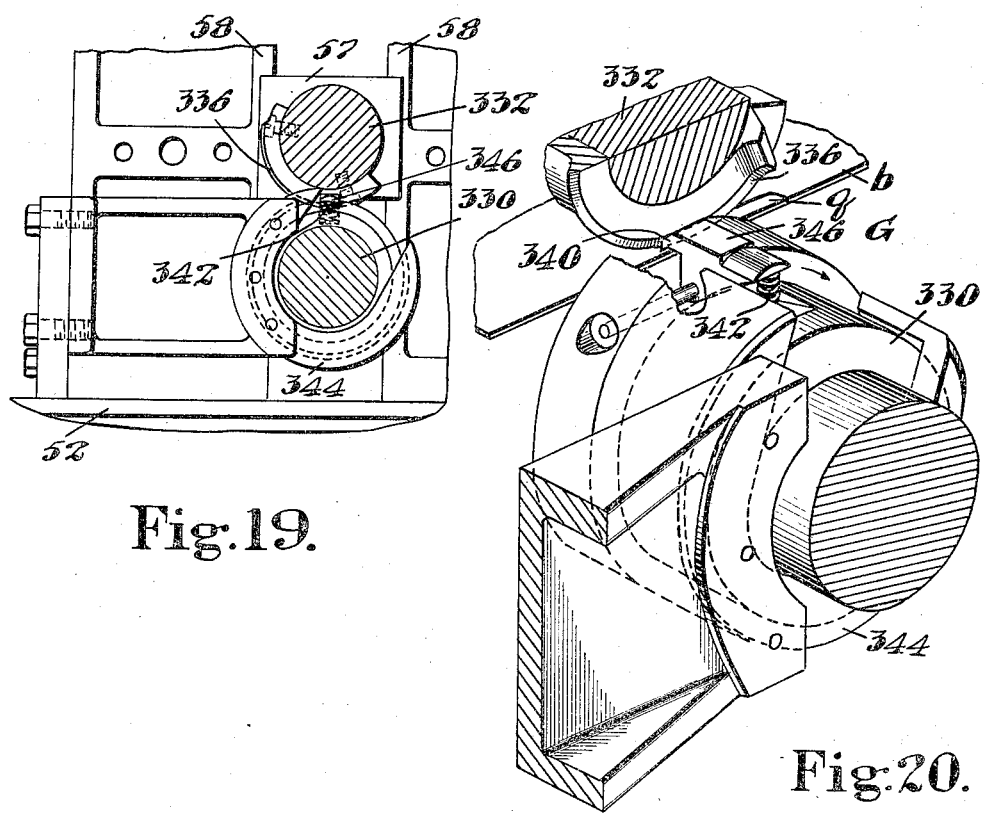
Fig.19.
Fig.20.
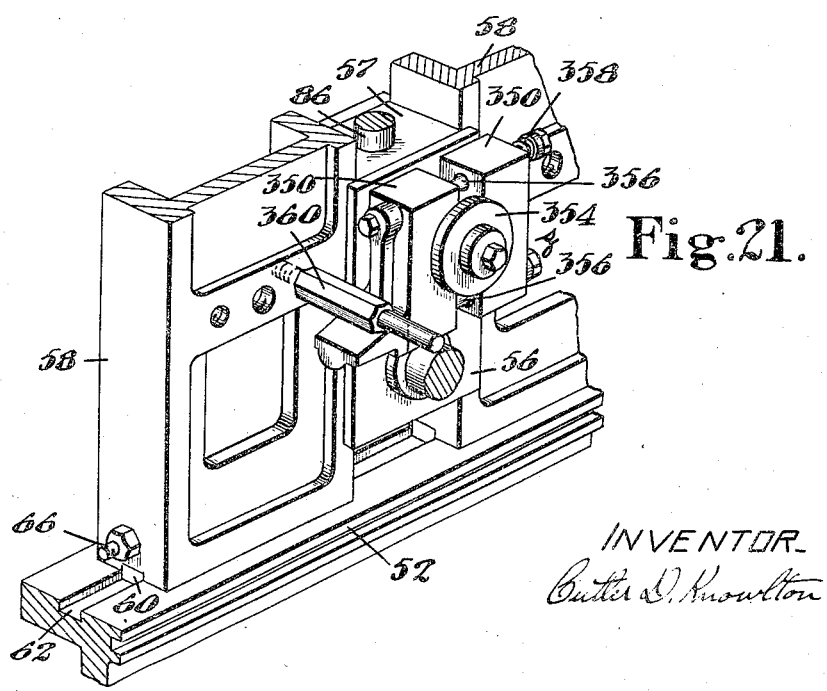
Fig.21.

INVENTOR
Cutler D. Knowlton

Jan. 22, 1935. C. D. KNOWLTON 1,988,451
BLANK MAKING
Filed Sept. 8, 1930 21 Sheets-Sheet 13
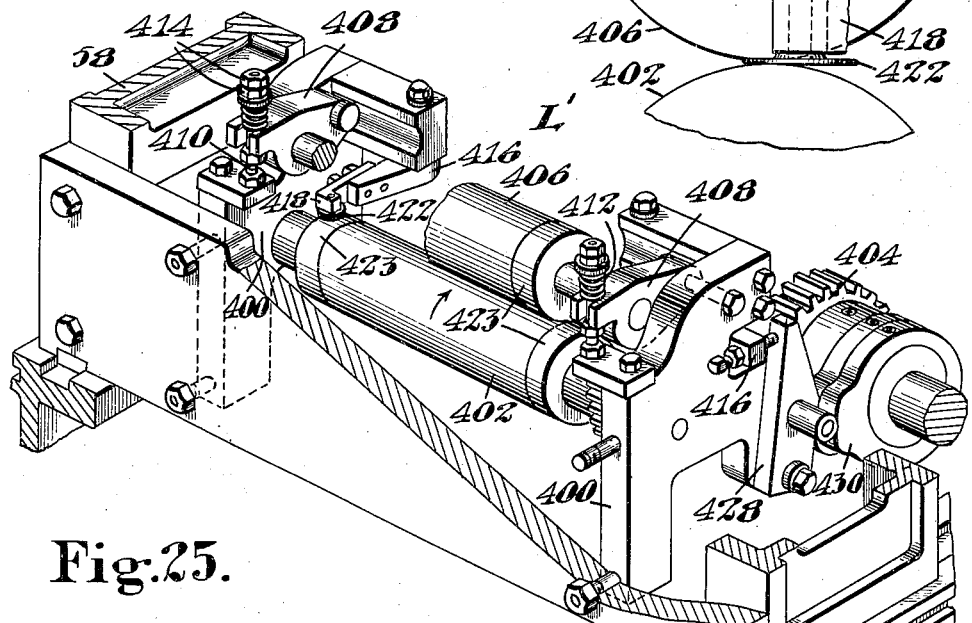
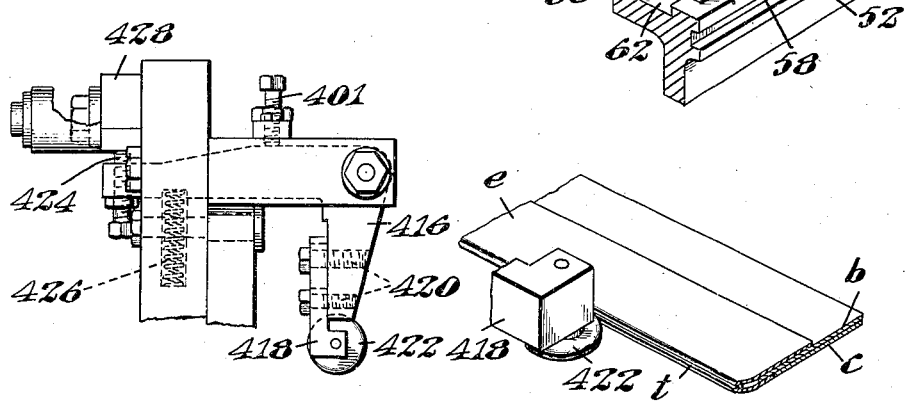
INVENTOR
Cutler D. Knowlton Jan. 22, 1935.                C. D. KNOWLTON                 1,988,451
                                BLANK MAKING
                    Filed Sept. 8, 1930        21 Sheets-Sheet 14
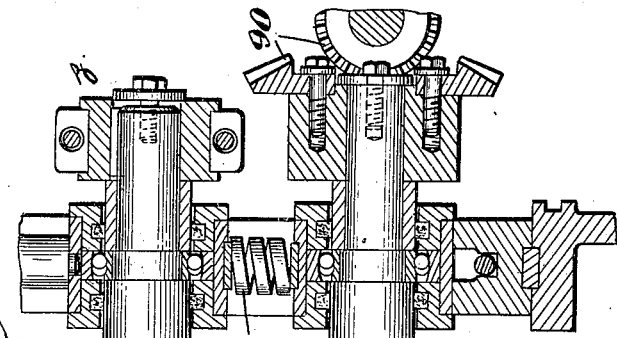
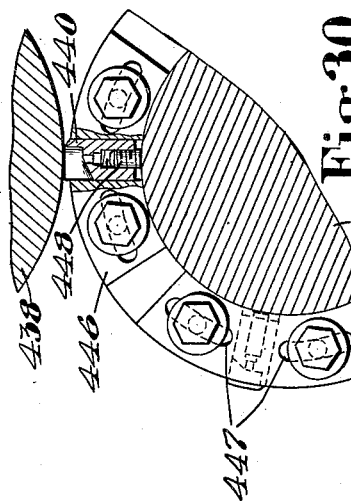
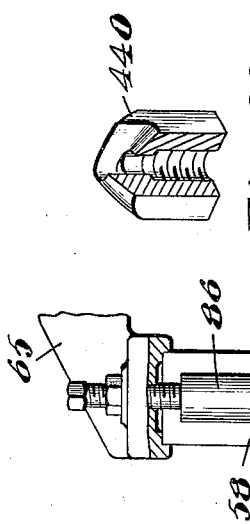
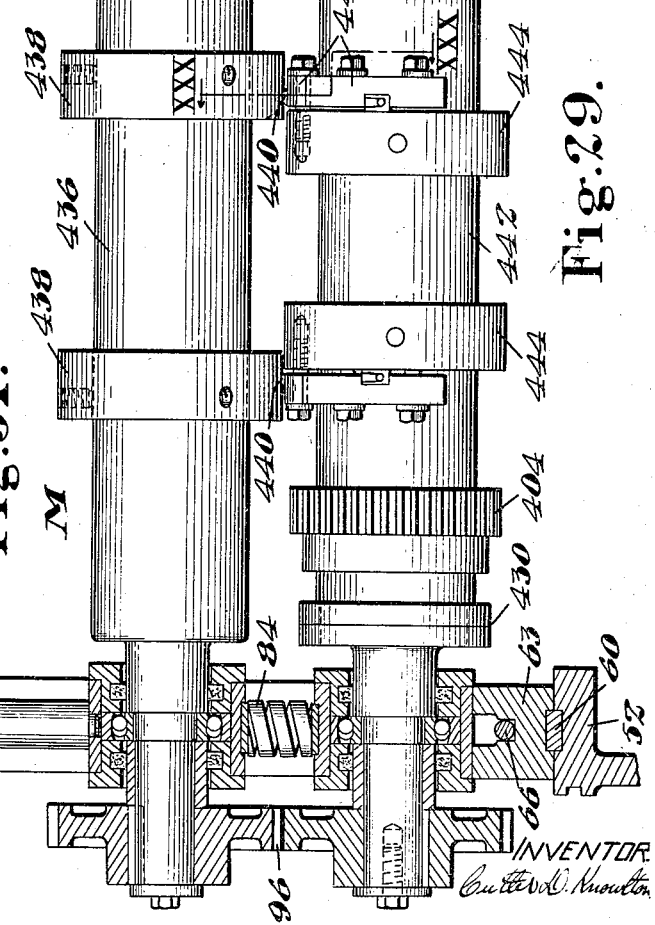
INVENTOR Jan. 22, 1935. C. D. KNOWLTON 1,988,451
BLANK MAKING
Filed Sept. 8, 1930 21 Sheets-Sheet 15

INVENTOR
Cutler D. Knowlton

Jan. 22, 1935.　　C. D. KNOWLTON　　1,988,451
BLANK MAKING
Filed Sept. 8, 1930　　21 Sheets-Sheet 16

INVENTOR
Cutler D. Knowlton

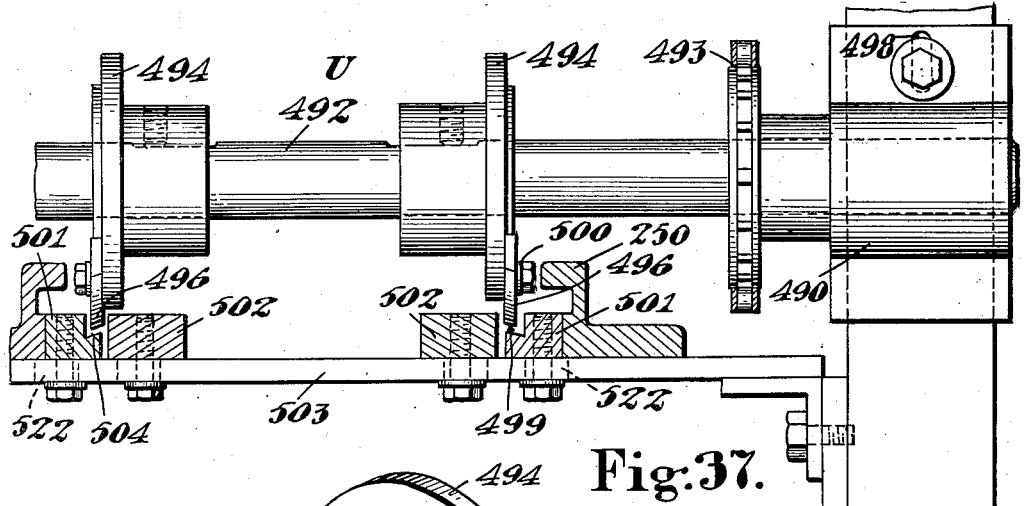
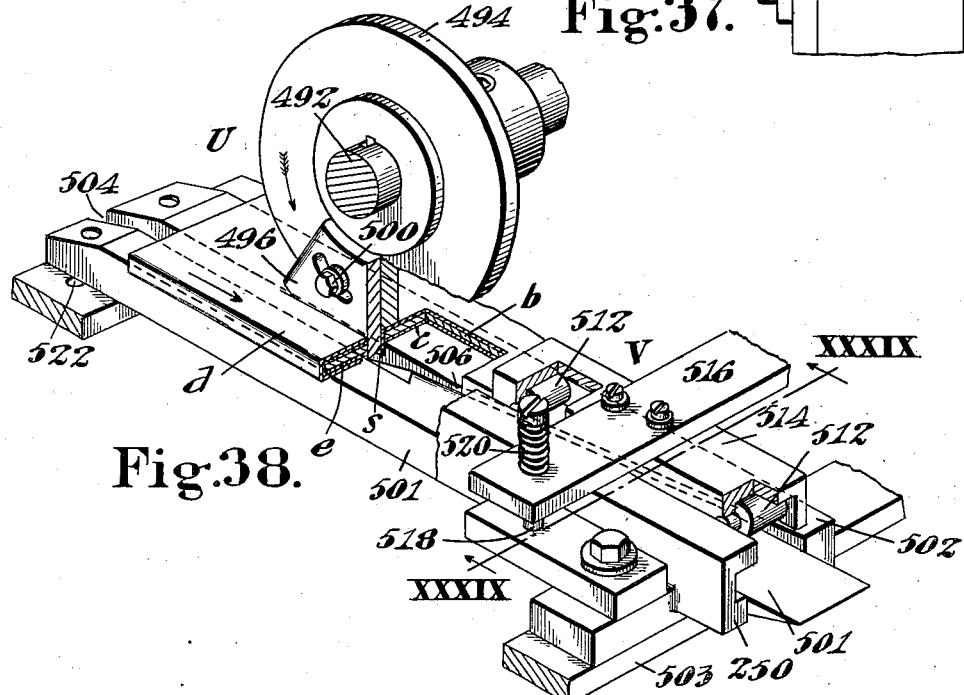
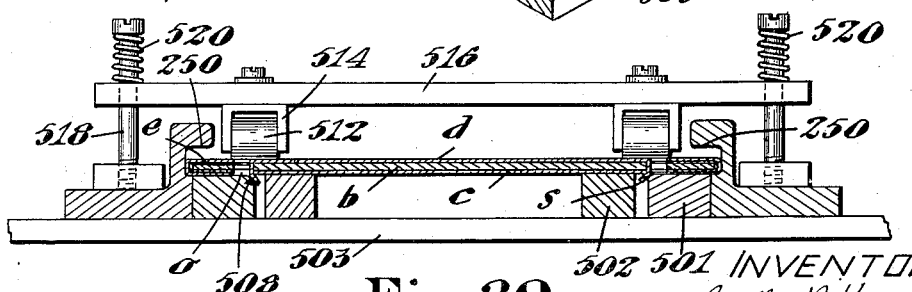

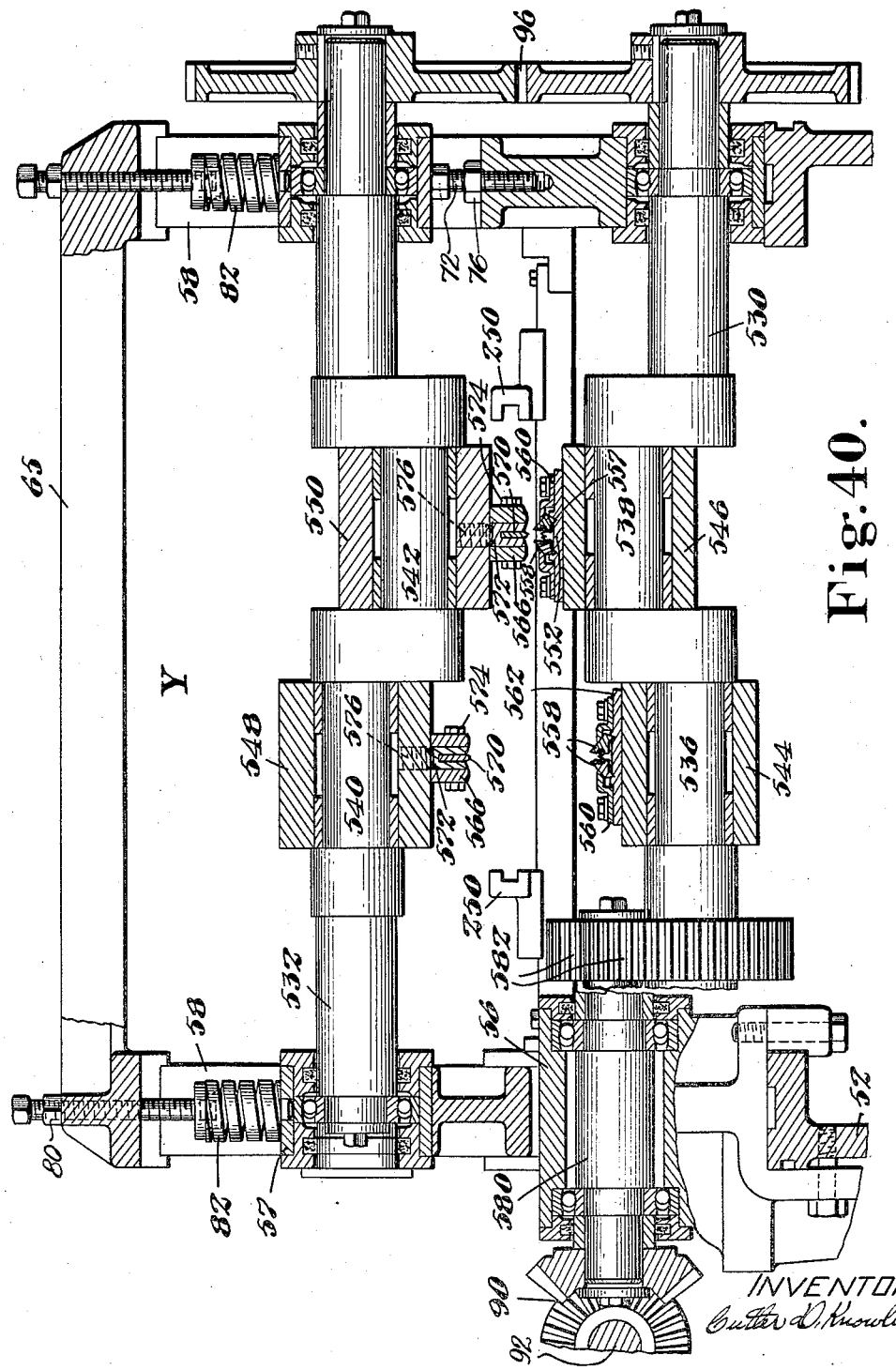

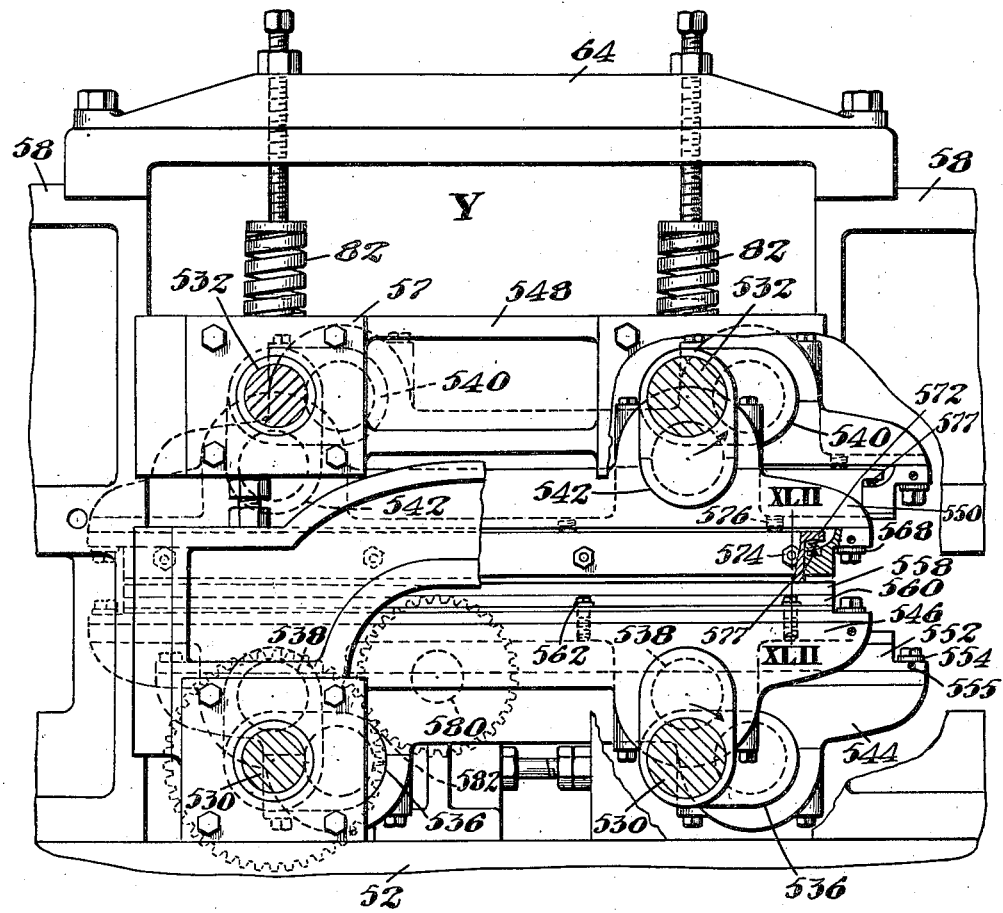

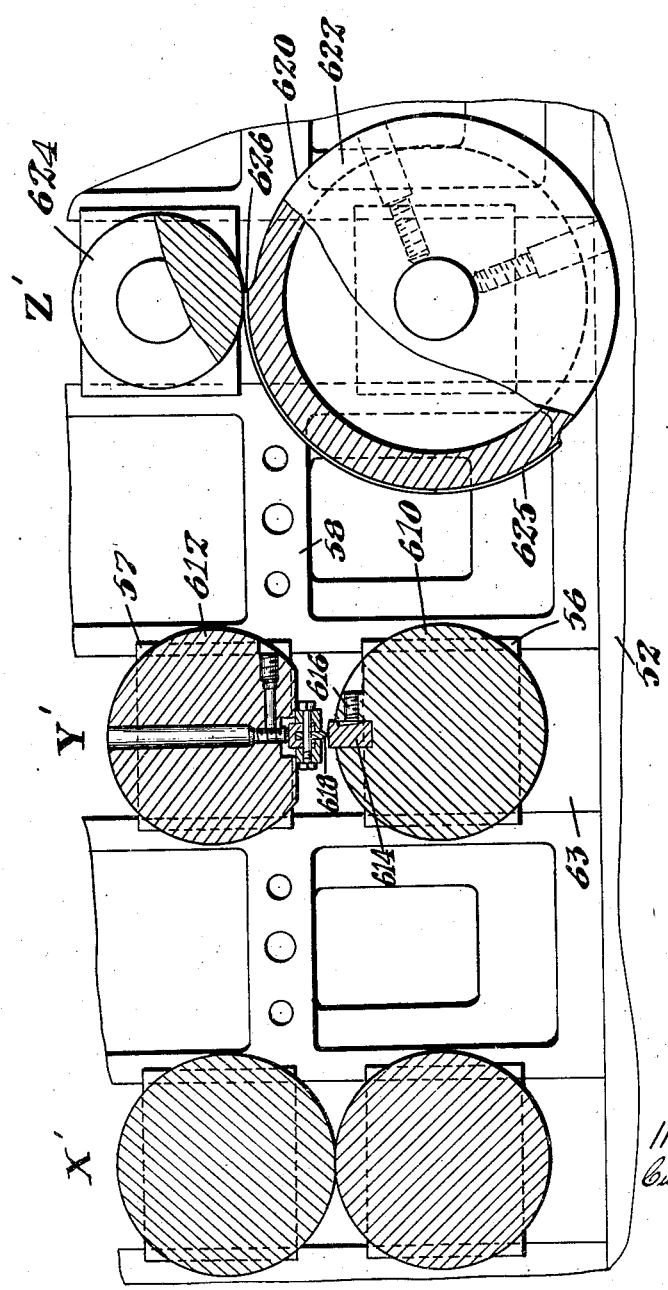

Patented Jan. 22, 1935

1,988,451

UNITED STATES PATENT OFFICE 1,988,451

BLANK-MAKING

Cutler D. Knowlton, Beverly, Mass., assignor to Hoague-Sprague Corporation, Lynn, Mass., a corporation of Massachusetts Application September 8, 1930, Serial No. 480,518

101 Claims. (Cl. 93—36)

My invention relates to the making of blanks, and more especially to blanks from which box-portions are to be produced, the illustrated embodiment of the invention being particularly adapted for the formation of cover-blanks of a character which permits them to be set up by means of the type disclosed in the application filed in my name in the United States Patent Office on July 7, 1930, Serial No. 465,941. It is to be understood, however, that box-body-blanks may also be made, and that they may be brought to box-form by other means than that of the application just mentioned, without departure from the spirit of the invention. There are included both an apparatus and a method of employing said apparatus. From this case there have been divided the following applications: Improvements in coil-supports, filed March 29, 1932, Serial No. 601,830; Improvements in cutting mechanisms, filed March 29, 1932, Serial No. 601,831; Improvements in blank-making, filed April 21, 1932, Serial No. 606,603; Improvements in art of supplying web-material, filed April 21, 1932, Serial No. 606,604; and Improvements in art of coating material, filed April 21, 1932, Serial No. 606,605. Of these applications, that bearing the Serial No. 601,831 matured on June 19, 1934 into Letters Patent of the United States No. 1,963,369.

Objects of the invention are to generally improve the efficiency of apparatus of the type referred to, to reduce the cost of its construction and to produce by its means stronger box-portions having a more attractive appearance. In the attainment of these objects, I have provided means for removing material from or notching the margin of shell-material which furnishes the principal layer of the blank and applying stay-material over the spaces thus produced; means for plaiting or depressing such stay-material, this action, especially when the margin of the shell-material has been notched to receive the depressed stay-material, strengthening the stay and giving, by its depression, a flush box-edge, there being a novel method of operation here involved; means for tucking slit cover-material into a slot in the shell-material, thereafter folding the tucked portion and pressing it against the shell to impart a finish to its edge; an economical apparatus-frame consisting largely of interchangeable units readily assembled into a strong structure; a simple bearing-supporting and positioning organization and driving means for the operating instrumentalities; improved mechanisms for stretching the shell-material to counteract its distortion by the stay- or other applied material, for slitting the cover-paper for the previously mentioned tucking, for mounting and adjusting creasing devices, and for ejecting the completed blanks from the apparatus; and improved means for stopping the advance of one or more of the material-webs if such webs break in their advance. Application Serial No. 480,517, filed in my name in the United States Patent Office on September 8, 1930, describes and claims a blank which may be produced under the method of and by the mechanism for operating upon the stay-material, as herein disclosed and claimed.

One of the many embodiments which my invention may assume appears in the accompanying drawings. In these, Fig. 1 shows, in side elevation, the entrance-end of the apparatus;

Figs. 2 and 3 are similar views, somewhat diagrammatic in character, of succeeding portions of the apparatus;

Fig. 4 is a perspective view of the entrance-end of the accumulator for the web of shell-material;

Fig. 5 illustrates in perspective the change-speed gearing for the web-driving mechanism associated with said accumulator;

Fig. 6 is a vertical section on the line VI—VI of Fig. 4;

Figure 1:
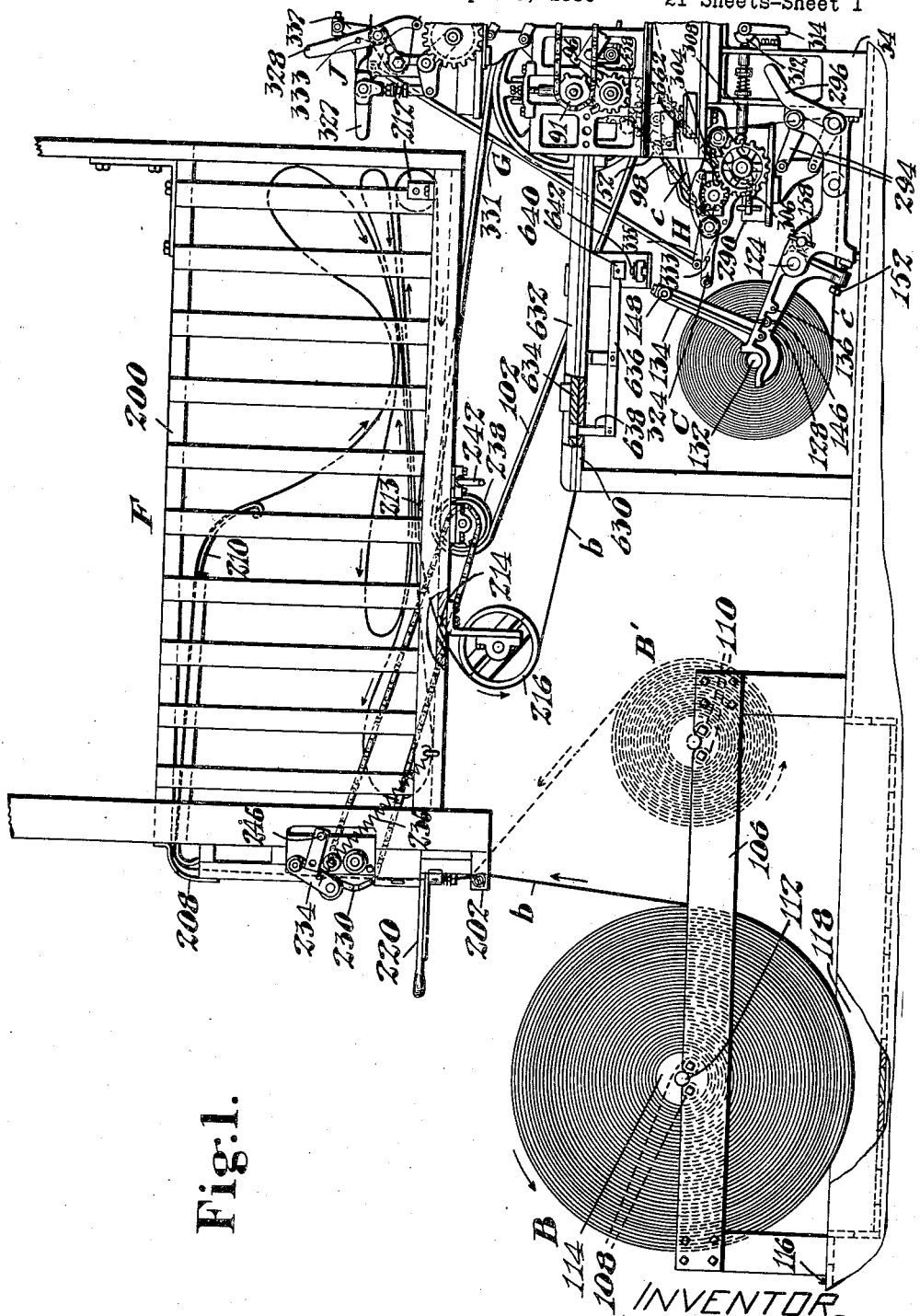
Figure 47:
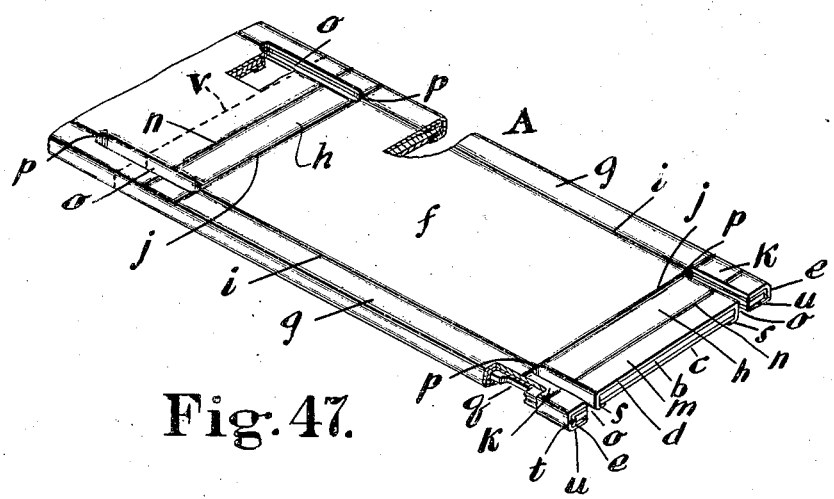
Figure 11:
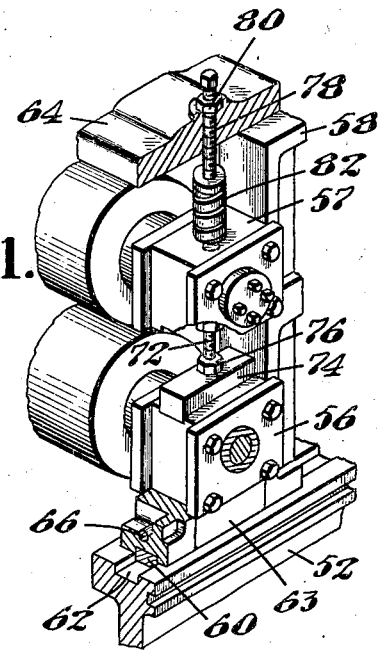
Figure 12:
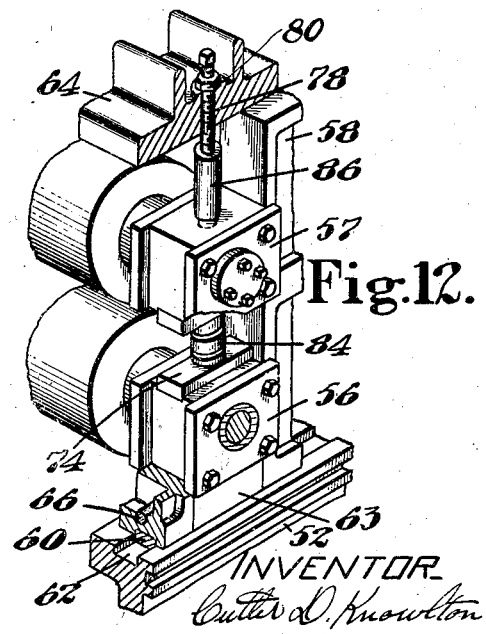
Figure 13:
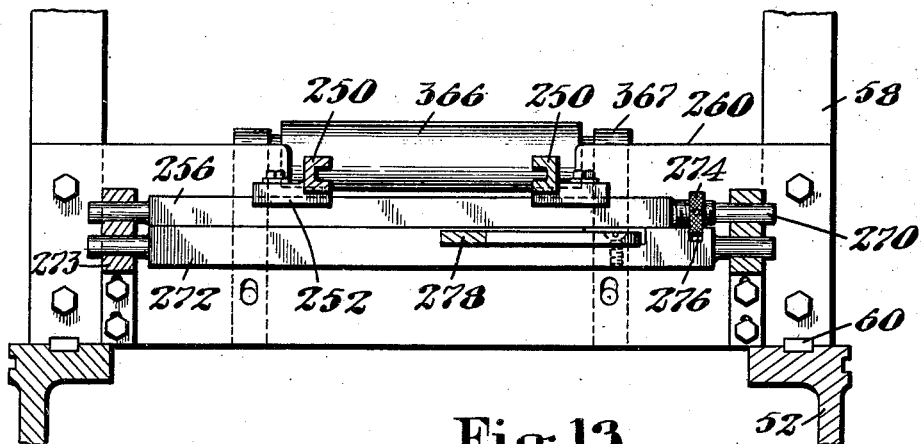
Figure 14:
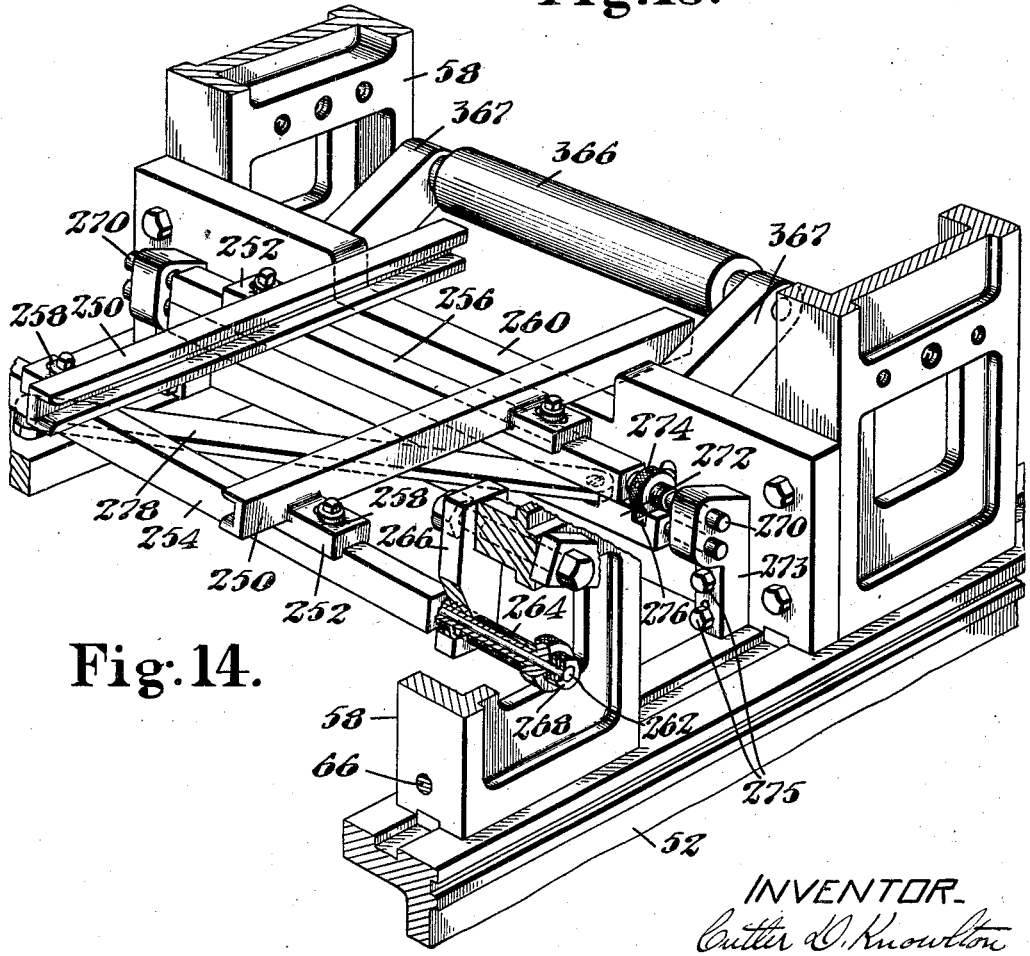
Figure 22:
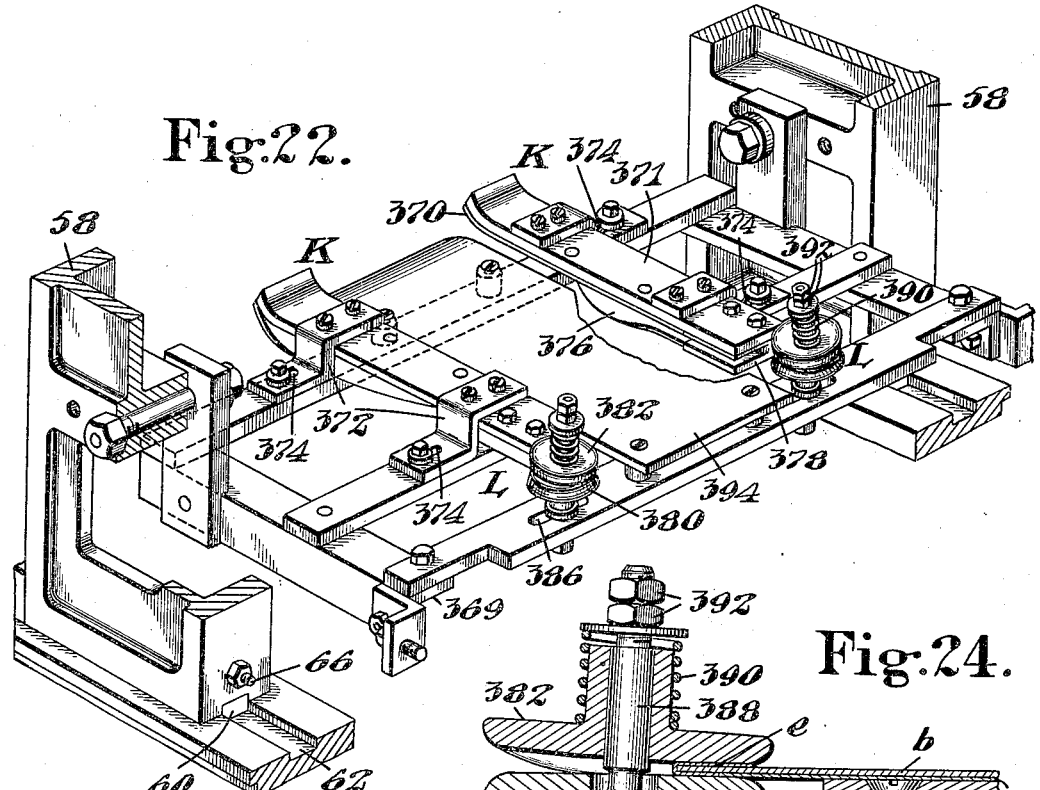
Figure 24:
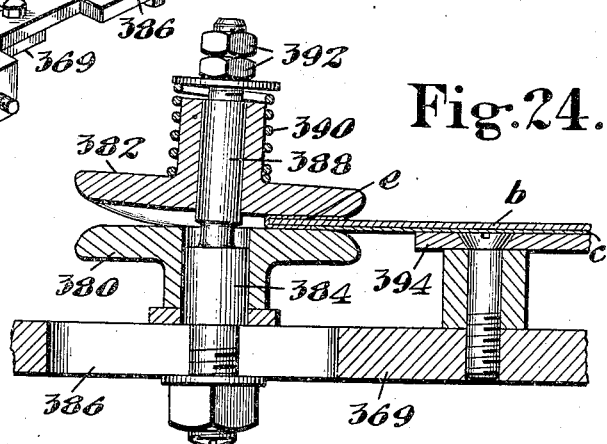
Figure 23:
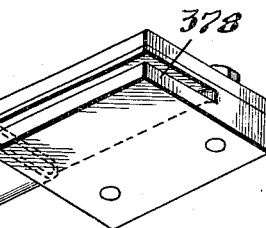
Figure 32:
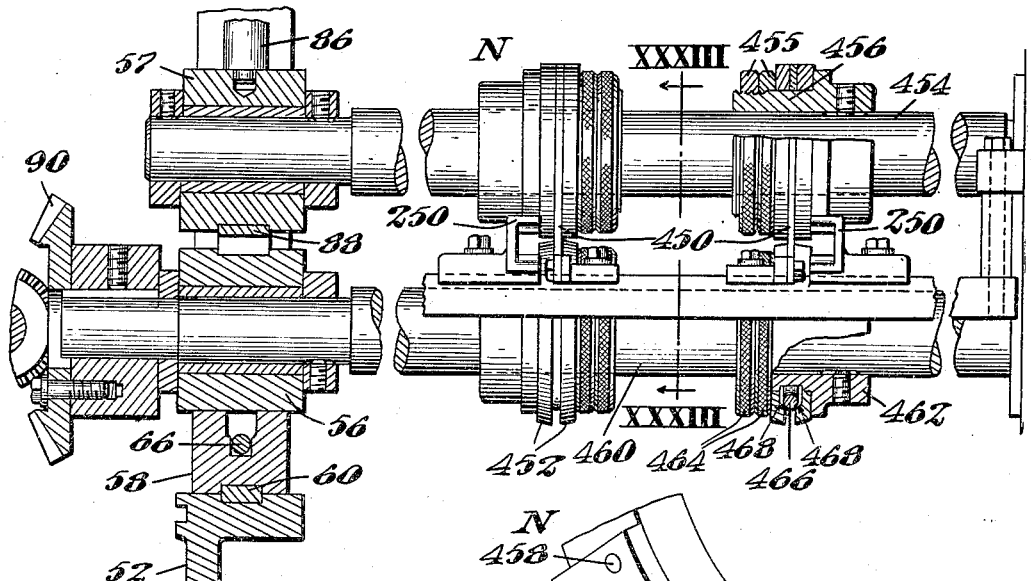
Figure 34:
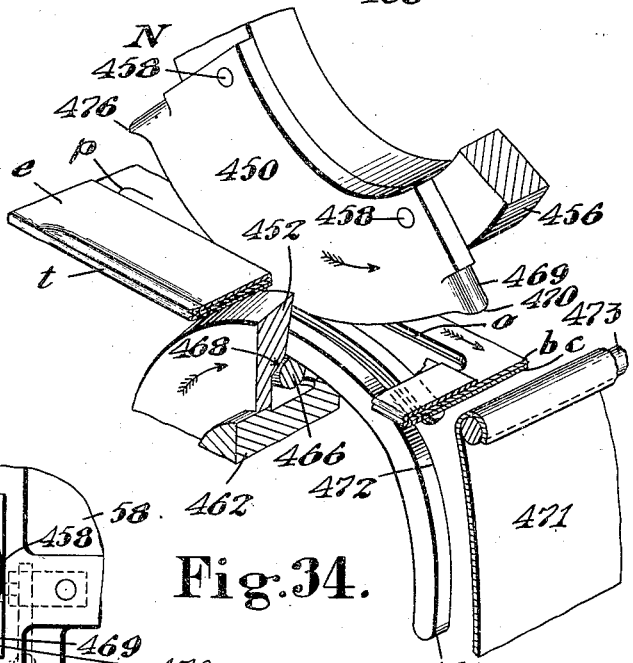
Figure 33:
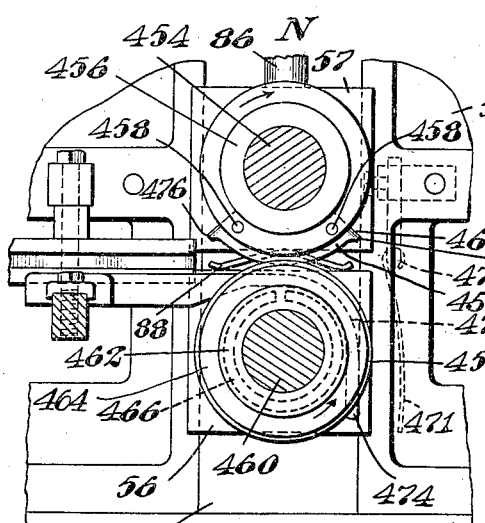
Figure 35:
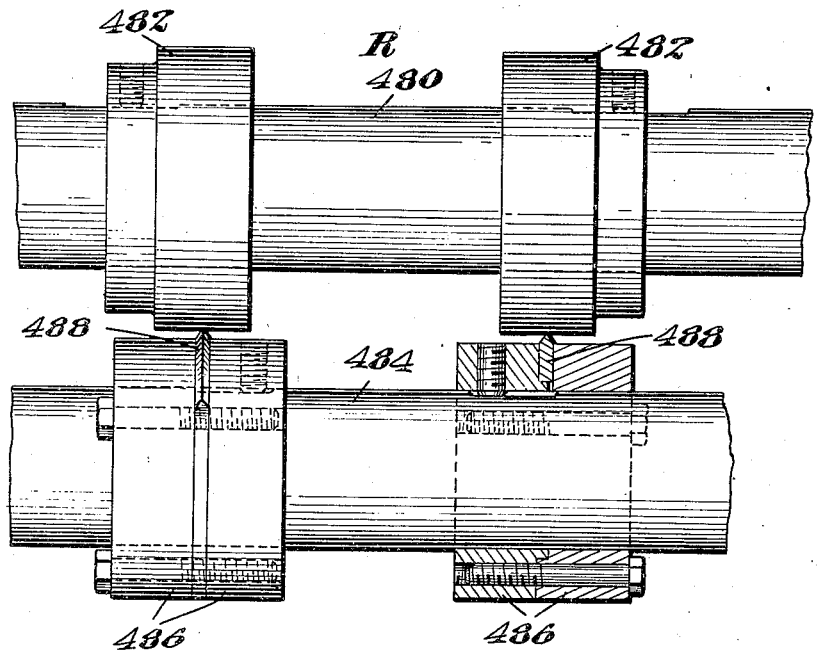
Figure 36:
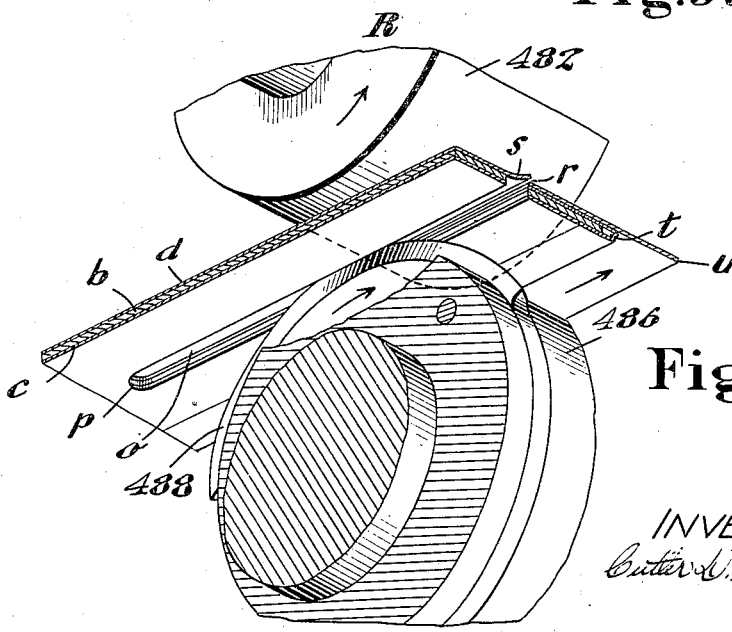
Figure 44:
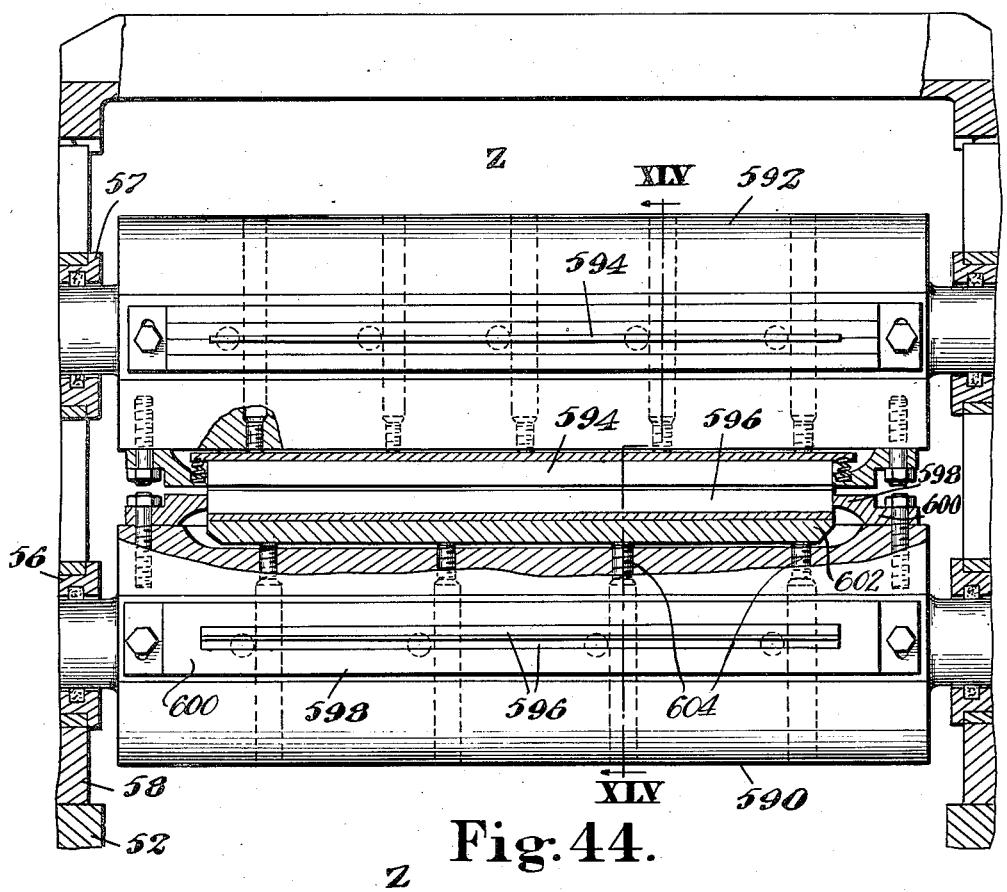
Figure 45:
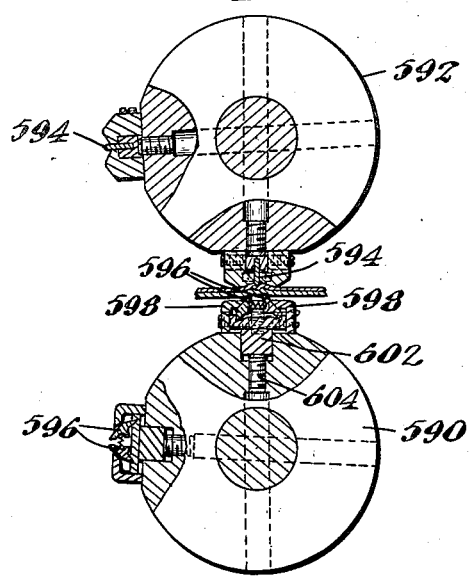

Figs. 11 and 12 respectively show in perspective mountings in which an operating roll is yieldably forced toward and from a companion roll;

Fig. 13 is a transverse section through web-guides which may be interposed between the various operating mechanisms;

Fig. 14 is a perspective view of such guides;

Fig. 15 shows in side elevation adjacent portions of Figs. 1 and 2, enlarged and including the edge-cutting, stay-supplying and gluing mechanisms, shell-, lining-, and stay-assembling and warp-removing mechanism and stay-folding and pressing mechanisms;

Fig. 16 is a perspective view of the latching device for one of the stay-reels;

Fig. 17 is a transverse sectional detail illustrating the adjusting means for a stay-reel;

Fig. 18 is an enlarged partial transverse section on the line XVIII—XVIII of Fig. 15 and particularly illustrating the edge-cutting mechanism;

Fig. 19 is a longitudinal section on the line XIX—XIX of Fig. 18;

Fig. 20 is a detail in perspective, especially bringing out the scrap-removing portion of the edge-cutting mechanism;

Fig. 21 shows in perspective a brake mechanism associated with the edge-cutting and other rolls;

Fig. 22 illustrates, in perspective, folding and pressing means which is of a form applicable to either the stays or the cover-material;

Fig. 23 shows one of the folding devices in enlarged perspective, looking from beneath;

Fig. 24 is an enlarged vertical transverse section through a pair of the folding disks;

Fig. 25 illustrates in perspective the stay-plaiting mechanism;

Fig. 26 is a vertical transverse section through such mechanism;

Fig. 27 is a top plan view of a plaiting disk and its actuating means;

Fig. 28 shows in perspective a plaiting disk, developing the manner in which it acts upon a stay;

Fig. 29 is an enlarged vertical transverse section through the end-cutting mechanism for slots, this being taken upon the line XXIX—XXIX of Fig. 2 and enlarged;

Fig. 30 is a partial section on the line XXX—XXX of Fig. 29;

Fig. 31 illustrates one of the end-cutters in broken perspective;

Fig. 32 is an enlarged transverse vertical section on the line XXXII—XXXII of Fig. 2, showing the side-cutting and scrap-removing mechanism for completing the slots;

Fig. 33 is a section on the line XXXIII—XXXIII of Fig. 32;

Fig. 34 is a perspective view of the elements of Fig. 32 more directly co-operating with the work;

Fig. 35 is a partial enlarged vertical transverse section through the slitting mechanism for the cover-material, this being taken on the line XXXV—XXXV of Fig. 3;

Fig. 36 shows the slitting elements in perspective, viewed from below the work;

Fig. 37 is a partial enlarged section on the line XXXVII—XXXVII of Fig. 3, through the tucking mechanism for the slit cover-material;

Fig. 38 shows in perspective said tucking mechanism and the associated folding and pressing devices;

Fig. 39 is a vertical transverse section on the line XXXIX—XXXIX of Fig. 38;

Fig. 40 shows the longitudinal creasing mechanism in section, taken on the line XL—XL of Fig. 3, on an enlarged scale;

Fig. 41 is a broken side elevation of said mechanism;

Fig. 42 is an enlarged section on the line XLII—XLII of Fig. 41;

Fig. 43 is a broken perspective view of one of the upper longitudinal creasing devices, taken from below;

Fig. 44 is a broken section through the transverse creasing mechanism, the view being taken on the line XLIV—XLIV of Fig. 3 and enlarged;

Fig. 45 is a vertical section on the line XLV—XLV of Fig. 44;

Fig. 46 shows the tension-rolls, with the cutting-off and ejecting mechanisms, in vertical section, taken transversely of the axes of the rolls; and Fig. 47 is a perspective view of a blank made by the apparatus and with a portion of a preceding blank still attached to it; see sheet 5.

The apparatus of this invention produces blanks from which may be set up a box-portion, this being either a box-body or a box-cover. In the present instance, a blank especially adapted for the formation of a cover is made. The features of this blank A may be seen in Figs. 28, 36 and 47 of the drawings. It consists of a principal layer of shell-material $b$, which may be of pasteboard, and an inner lining-layer $c$ and an outer cover-layer $d$ of such relatively thin material as paper, which conceals both faces of the rough shell. Broadly, both of these finishing layers may be considered as cover-material. Further, there is over each longitudinal edge of the shell, beneath the cover-paper, a folded strengthening strip or stay $e$, which may be of tough paper of a grade known as Kraft. The blank has a central body-portion $f$, usually elongated, from the longitudinal edges of which extend side-wings $g, g$, while from the intermediate edges project end-wings $h, h$, creases $i$ dividing the side-wings and creases $j$ the end-wings from the body. From the opposite extremities of the side-wings project corner-laps $k$, the meeting lines of which are defined by continuations of the creases $j$, which continuations, however, are shown as somewhat offset inwardly, so when the cover is set up, the corner-laps may lie smoothly within the end-wings, the latter furnishing the outer layers. The end-wings carry extensions $m$, there being creases $n$ between them. Separating the corner-laps from the end-wings and their extensions are narrow slots $o$, the ends $p$ of which are rounded and at least reach the creases $j$ and their extensions. The outer edges of the corner-laps and the immediately adjacent portions of the side-wings are cut away at $q$ (Fig. 20) to receive the end-wing-extensions, when these are turned in about the creases $n$ to be secured against the inner faces of the corresponding end-wings and corner-laps, as shown in United States Patent No. 1,627,812, Smith, May 10, 1927. There results a lower edge of the set-up cover lying in a single plane. The cover-material $d$ is slit at $r$ (Fig. 36) adjacent to the inner edge of each corner-lap, and the portion projecting over the edge of the adjacent end-wing and its extension is tucked through the slot $o$ and then folded over and secured to the end-wing and its extension. This is to conceal the raw edge of the shell-material $b$ at the corner of the cover after the blank has been set up. The stays $e$, before the application of the cover-paper which conceals them, are depressed into the cut-out portions $q$ of the shell, preferably to form a central groove $t$ (Fig. 28) with plaits of the stay-material at each side. These depressions double the number of layers at the outer portion of each stay, giving four thicknesses instead of two, and thus increase proportionately the strength of that portion of each corner of the set-up cover which is especially subjected to rupturing strains. The softening of stay-material of the character of Kraft paper by the depression is also advantageous, in that a break in it is less liable to start in a somewhat flaccid material at a localized point of weakness than in a stiff sheet. In addition to these advantages, the stay-material is better disposed in the cut-away portions of the shell to allow the reception of the end-wing-extensions and to give the desired flush edge about the entire cover. The stays e at the outer face of the blank may cover substantially the entire side-wings and corner-laps and be turned over the edge of the shell to meet the lining-material c, being here narrower than upon the opposite face. Folded-over edges u of the cover-material, along the side-wings, overlie and conceal the edge of the shell-material, the inner folds of the stays and the edges of the lining-material.

A general outline will now be given of the novel apparatus for making the blank A just described, reference being had to Figs. 1, 2 and 3 of the drawings, which, placed one after another in the order just given, illustrate the entire apparatus. All the material employed in constructing the blank is in the form of continuous webs, the widths of which correspond to those in which they are found in the blank, without trimming. Coils or rolls B and C of the shell-web and lining-web, respectively, appear in Fig. 1, coils E of stay-web in Fig. 2, and a coil D of cover-web in Fig. 3. From the coil B, the strip of shell-material b passes through an accumulator F, in which is maintained a surplus to be drawn upon during the bringing of a new coil into position to replace one exhausted and its splicing to an end of the strip which came from the latter coil. Advancing from the accumulator, the shell-web passes through a mechanism G, which cuts out the opposite spaces from the edges at q, there being made simultaneously the cuts at both sides of the blank, and these being of sufficient length to form cut-out portions in adjacent blanks, the web being finally severed across the centers of these cuts. The lining-material c, coming from the coil C, is acted upon by a gluing mechanism H, which coats its entire upper surface, and thereafter joins the shell-material at assembling rolls I, together with the two strips of stay-material e from the coils E, E. These stays are coated upon their under sides by a gluing mechanism J and laid upon the upper face of the shell-web, with the edge of each stay extending beyond the shell ready for turning over to adhere also to its under side. At the assembling mechanism I, the shell is subjected to a stretching action which will neutralize the distorting effect of the stays when these dry. This occurs as the shell, lining and stays are all pressed together to cause adhesion of the glued surfaces. Next, opposite stationary devices K, K fold over the projecting portions of the stays, whereupon the edges of the assembly travel between pairs of disks L, L, which wipe out and press the stays against the shell, causing their attachment at the under side. Upon leaving the disks L, the rounded-over portion of each double stay is again doubled, being forced at t (Fig. 28) into place in the space q at the outer edge of the shell-web. This is accomplished by mechanism L', which also applies some further pressure to the stays to complete their adhesion. A mechanism M now cuts the curved ends p of the opposite slots o in the adjacent partially formed blanks; after which a mechanism N connects these end-cuts by straight side-cuts and forces out the scrap thus produced. Mechanism for printing upon the lining may follow at O, and beyond this a space is shown, in Fig. 2, in the chain of operating mechanisms, which is occupied only by a pair of web-supporting and advancing rolls O'. For these rolls may be substituted, however, some mechanism to act upon the material, as a means for applying to the shell a pre-cut whole wrap in place of the cover-material d, the latter only being herein fully disclosed. This cover-material, when taken from its coil D, receives the action of gluing mechanism P and then passes with the remainder of the web-assembly between the rolls of a pair Q. The material d fully covers the outer face of the shell and the adhering stays e, e, and projects beyond the edges sufficiently to be turned over and meet the edges of the lining-material c on the under side, concealing the shell-edges along the side-wings and also the inner portions of the stays. As the succeeding operation, the cover-material is slit by a mechanism R at the outer edge of each slot o; after which devices S fold the free marginal edges u of the cover-material, and these are pressed, to produce their adhesion to the stay-material, by pairs of disks T, T, as was the stay-material at K and L. Following this, mechanism U tucks the severed edge of the cover-material s through each slot o, and a fixed device V at each side of the apparatus folds the cut edge over the shell-material along the end-wings and their extensions, to hide the exposed edges of the former, while immediately associated means applies pressure to the folded-over portions. Rolls W press all the layers of material together, to complete the assembling operation, and then abrading mechanism X may, if desired, act to roughen the surface of the cover-material over the corner-laps k to promote adhesion. At a mechanism Y, the longitudinal creases i are produced, and at Z, the transverse creases j and n. At X', a pair of rolls maintain the webs under tension and in correct relation to various operating mechanisms. The assembling and forming operations having been completed, a cutting mechanism Y' successively severs the assembly to form discrete blanks, while mechanism Z' ejects the severed blanks from the apparatus.

Figure 10:
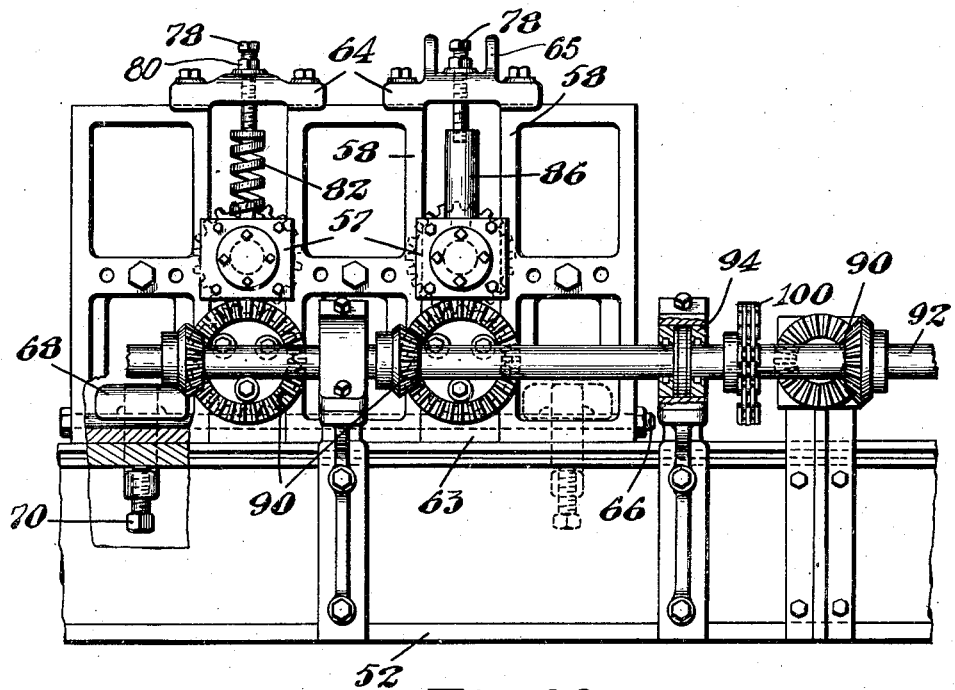
Fig. 10 is a detail in side elevation illustrating the manner in which the operating rolls are mounted and driven.

A base-frame 50, upon which the various operating mechanisms and devices of the apparatus are mounted, may be in three similar sections, each including longitudinal bars 52 supported by legs 54. The principal driven operating elements of the apparatus consist of rolls, or revoluble members, such as knives or bars, which are carried upon rolls or roll-like elements. Throughout, the rolls of the various mechanisms, other than in a few instances which will be particularly specified, are arranged in pairs, with their axes vertically alined and journaled in lower fixed bearings 56 and upper yieldable bearings 57, located between identical housings or upright members 58; see particularly Figs. 10, 11 and 12. The housings are horizontally alined in a series at each side of the base-frame by keys or projections 60 entering grooves or ways 62 extending longitudinally of the frame-bars 52. The housings of each pair are shown as spaced from one another at their lower portions by blocks 63, while at their tops they are held in correct relation by yokes 64 bolted at their opposite extremities to adjacent housings, and by cross-ties 65 (Fig. 18) extending transversely of the frame. These cross-ties may be integral with certain of the yokes, as each alternate pair. Rods 66 pass through alined openings in the housings and blocks 63 above the bars 52, and join the housings in convenient groups made up of standard parts readily varied to meet particular requirements. These groups are secured to the base at each side by clamps 68 provided with an upper arm extending over a corresponding rod and a screw 70 threaded through a lower arm and abutting against a flange upon one of the frame-bars.

The bearings may be of the plain, roller or ball-type, the last, as appearing, for example, in Fig. 18, being employed where cutters act against abutment-surfaces and it is desired to minimize the play and thus keep the cutters acting over unvarying opposed areas.

The upper bearings 57 are arranged to slide upon the housings with respect to the companion bearings 56, being either yieldable from the corresponding lower bearing, so separation may occur if there is an overload, as is the case with the rolls or operating instrumentalities of the assembling mechanisms I, Q and W, the supporting and feeding devices O' and X, the creasing mechanisms Y and Z, and the ejecting mechanism Z', or toward the lower bearing, the extent of separation being definitely determined, a condition found in the edge-cutting mechanism G, the end- and side-slotting mechanisms M and N, the slitting mechanism R and the cutting-off mechanism Y'. These two arrangements are respectively illustrated in Figs. 11 and 12. In each, provision is made for fixing the axes of the bearings 57 at different heights, so rolls of different diameters may be utilized for operating on blanks of diverse lengths, and the springs which give the yield are adjustable to offer varying resistances. In Fig. 11, and at the left of Fig. 10, the space between the axes of the rolls is determined by a screw 72 threaded vertically into a block 74 resting upon the bearing 56 and supporting upon its head the bearing 57. The screw is retained in its adjusted position by a lock-nut 76. Above the bearing 57, a screw 78 is threaded vertically through a corresponding yoke 64 and locked by a nut 80. Between the lower extremity of the screw 78 and the bearing 57, a spring 82 is interposed. If the yield of the upper roll is toward the companion roll, as appears in Fig. 12 and at the right of Fig. 10, a spring 84 is substituted for the screw 72 and a spacer-rod 86 may take the place of the spring 82. The screws, springs and spacers may vary in length, according to the diameter of the rolls employed, and springs of different characters used, a leaf-spring 88, such as appears in Figs. 18, 32 and 33 being substituted for a helical spring when the axes of the rolls must approach closely.

Generally, throughout the apparatus, rotation may be imparted to the lower roll of each pair through bevel-gearing 90 (Fig. 10) from a single line-shaft 92 journaled in bearings 94 upon one side-bar 52. In each case, the upper roll is rotatable in the desired time-relation from the lower roll by spur-gearing 96 at the ends of the roll-shafts opposite the gearing 90, as is shown, for example, in Fig. 18. An exception to the direct bevel-gear-drive from the line-shaft occurs at the assembling mechanism I. Here, while the upper roll is of the same diameter as those of the associated mechanisms, the lower roll is smaller, to obtain a bending of the shell-material, and therefore cannot conveniently be rotated by bevel-gearing from the line-shaft. Consequently, the upper roll is driven by sprocket-gearing 91 from the preceding mechanism G (Fig. 15), and the lower roll of the mechanism I is rotated from the upper at the desired higher speed by spur-gearing 97. The gluing mechanisms H, J and P may be driven by sprocket-gearing 98 from one of the roll-shafts of an adjacent operating mechanism. The accumulator F is connected by belt-gearing 102 to the upper roll of the mechanism G. Power is applied to the line-shaft 92 by sprocket-gearing 100 (Fig. 3) joined to a motor 101.

For the coil B of shell-material b is provided a mounting which facilitates the putting in place of the relatively heavy body and transferring the connection of the advanced portion from the exhausted to a fresh coil. At the entering end of the apparatus is a frame having horizontal sidebars 106 (Fig. 1) spaced to receive coils of the shell-material between them, and carrying two transversely-alined pairs of rolls 108, 108 and 110, 110. These pairs of rolls are respectively arranged to retain against displacement and to facilitate the rotation of a spindle 112 projecting from a core 114 in a shell-coil B, newly introduced, and the spindle of a largely unwound coil B'. At the outer side of the frame is a platform or supporting surface 116, the height of the top of the bars 106 above the platform being such that, when a full coil of shell-material rests at its periphery upon the latter, the spindle 112 will be somewhat above the bars. That is, the height of the bars is less than the radius of the coil. Beneath the frame is a pit or depression 118, the depth of which permits the full coil B to turn without contact with the bottom. Assuming a coil B to be in place on the rolls 108 and in use, this continues until there is comparatively little of the shell-material left upon the coil. Then the operator shifts the spindle along the bars 106 until it rests upon the rolls 110 in the position B', the drawing-off of the shell-web continuing without interruption. This leaves the rolls 108 free for the support of a new coil of the shell-web, which is rolled from the platform 116 over the pit, the spindle descending on the tops of the bars and traveling along these until it is seated between the rolls 108. To the free end of the newly positioned coil is applied a piece of adhesive-paper having a projecting portion. One of these coupling pieces is shown at y in Fig. 15, applied to a coil E of stay-material. As the last convolutions of the coil B' are being drawn off, the operator stops the feed of the web with devices at the accumulator F, which will be later described, and, holding the forward portion of the web, divides it from the short length remaining at B', and, while the apparatus draws upon the excess material in said accumulator, splices this forward portion by the piece y to the end of the new coil B. The operation of the apparatus continues without interruption, and it is only necessary to later reject a single blank which contains the splice.

Figure 7:
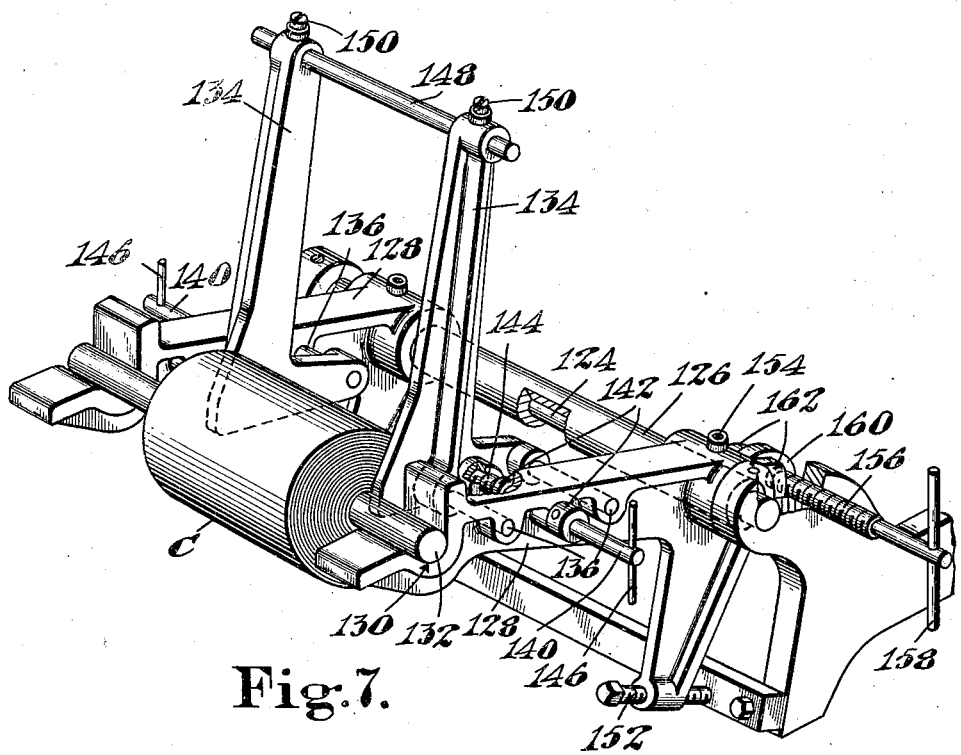
Fig. 7 is a perspective view of the supporting means for the coils of lining-material and cover-material.

The coil C of lining-material and coil D of cover-material may be supported and adjusted by identical structures, one of which is illustrated in Fig. 7. Extending transversely of the main frame is a fixed spindle 124, about which may move longitudinally a sleeve 126. Arranged for angular adjustment about the sleeve are spaced arms 128, 128, provided with horizontally alined depressions 130 to receive the spindles 132 about which the coils of lining- and cover-material are wound. To hold the edges of the successive convolutions of the coil in the same vertical planes, each arm has an upwardly extending retaining member 134 provided with horizontal guide-rods 136, 136 passing through openings in its arm. Turning in each arm is an adjusting-rod 140, prevented from moving longitudinally by collars 142, 142 secured to the rod upon opposite sides of the arm. At 144, the rod is threaded into the adjacent arm. When either rod 140 is rotated by a hand-piece 146, the corresponding retaining member may be slid into the desired retaining relation with the sides of the coil of material. Here, both members may be locked by a connecting-rod 148, passing horizontally through openings in their upper extremities and secured by set-screws 150. It may be desirable, especially in setting up the apparatus, to vary the angular relation of the arms 128 about the sleeve 126. This is useful in so locating the depressions 130 that the coil-spindle 132 will be horizontal, causing the web at its opposite edges to leave the coil in the same direction and thus without distortion. This is accomplished by screws 152 threaded through depending portions of the arms and contacting with an element of the frame. After adjustment, the arms may be fixed to the sleeve by set-screws 154. The transverse position of the coil as a whole, and therefore the direction in which the web as a whole runs, is shown as variable by a screw 156 threaded through a frame member and rotatable by a hand-piece 158. A flange 160 on the screw, at its inner end, turns between lugs 162 projecting from the adjacent arm 128. Rotation of the screw 156 shifts the arm, and the sleeve 126 to which it is secured, in one direction or the other, and consequently adjusts across the path of the material the entire coil-supporting structure.

The manner of supporting and changing the coils E of stay-material e is illustrated in Figs. 15, 16 and 17, it being remembered that there are two of these devices, one delivering to each edge of the shell-web. From a hub 170 extend diametrically opposite carrier-arms 172, 172. The hub is rotatable about a horizontal spindle 174 secured in a frame-bracket. Opposite depressions 176 in the hub, either of which may be engaged by a latch 178 pivoted upon the bracket, allow either arm to be maintained uppermost. Extending horizontally from the outer extremity of each arm is a spindle 180, about which turns a reel 182 for the stay-material, the reel being removably retained upon the spindle by a screw 184. To adjust the reels so the strips will run off in the proper directions, each arm 172 has a screw 186 threaded into it, this screw having a head and finger-piece 188 entering a slot 190 in the associated spindle. As the screw is rotated, and therefore its head carried toward or from the arm 172, the reel-spindle is correspondingly shifted to create the desired alinement. As illustrated, the reel of stay-material which is being used is uppermost. When this is approaching exhaustion, the latch 178 is lifted and the arms 172 rotated in a counterclockwise direction (Fig. 15), the drawing-off of the stay continuing during this movement. A fresh coil has been applied to the arm which was beneath, but which is now raised. The end of this fresh coil of stay-material may have attached to it the glued connecting-strip y of paper, previously mentioned in describing the connection of the webs of shell-material. The strip e enters the gluing mechanism J between a pair of rolls 189, 189, the upper of which is shown as yieldably mounted upon pivoted arms 191. Just before the end of the old coil is reached, the operator secures to it the extremity of the new coil by the piece y, and allows the thus-formed connection to pass through the rolls 189. The pressure of these rolls perfects the adhesion of the connector and stay. As the glued joint emerges from the rolls, the operator tears off the end of the old coil, removing the short piece which remains. The end of the new coil travels on, joined to the forward portion of the old coil. In such a splicing operation, if the operator is skillful, he may permit the whole of the old coil to run off its reel, connecting its extreme end to the coil which replaces it. There is shown, arranged to bear upon the upper coil of stay, a brake device to maintain the strip e under tension. This may consist of an arm 192 pivoted on the frame and having a shoe 194 of felt or the like for contact with the periphery of the coil.

The accumulator or storage means F, in which, as already pointed out, a supply of shell-material may be maintained to draw upon during its splicing, is interposed between the support for the coils B and B' and the first operating mechanism G. It is shown in Figs. 1, 4, 5 and 6 of the drawings. It preferably comprises a receiver in the form of a slatted cage or compartment 200, through the openings of which the accumulation of the material may be observed by the operator. The internal width is somewhat greater than that of the shell-web, and it is horizontally elongated, its dimensions being such that the material may fall in a number of loose, superposed, oppositely extending loops, as illustrated in Fig. 1. The web b runs from the coil B substantially vertically, guided at the inner side by the wall of the cage and at the outer side by a roll 202, a removable rod 204 and overhanging side-portions 206, 206. It enters the cage through a throat 208, passing over a somewhat downwardly inclined supporting wall 210 to gather in loops on the bottom of the cage. The leading end of the web from the lowest loop passes over a guide-roll 212 and a guide-rod 213 for supporting it above the bottom of the cage, the rod directing it through a slot 214 therein. Emerging from the slot, the web passes about one side of a drum 216 journaled horizontally below said cage, traveling on to the first operating mechanism G.

At the entrance-end of the cage, below the throat 208, are a cutting device, for severing the web of shell-material preparatory to splicing, and a variable feeding mechanism, for determining the rate at which the web is supplied to the cage. Side-walls 218, 218 position the web transversely for both the cutting and feeding operations. The cutting device may be mounted between the roll 202 and the rod 204, and may consist of a pivoted knife 220 co-operating with a leger-blade 222. The feeding mechanism includes rolls 224 and 226, between which the web passes, both rolls having horizontal axes alined in substantially the same plane longitudinally of the cage. The roll 224 turns in fixed bearings upon the wall of the cage, and is rotated through spur-gearing 228 and sprocket-gearing 230 from the belt-gearing 102. Spur-gearing 232 drives the roll 226 from the roll 224 at the same peripheral speed. The roll 226 is journaled in pivoted arms 234, 234, and is drawn toward the companion roll by a spring 236 to grip the web and advance it into the cage. The travel imparted to the web by the feed-rolls, as compared with that caused by the operating mechanisms, determines the amount of said web which accumulates in the cage. This is made variable, to permit the operator to maintain a sufficient excess upon which to draw during the splicing of the web without overfilling the cage during normal operation. I effect this by introducing a cone-pulley 238, driven by the belt 102 and driving the sprocket-gearing 230. A belt-shifter 240, operable by a screw 242, provides for the positioning of the belt 102 at different points along the cone, thus rotating the rolls 224, 226 at different speeds. To stop completely the feed of the web into the cage, the roll 226 may be swung back out of driving engagement with the web by a cam-shaft 244 rotatable by a crank 246 and acting upon one of the arms 234. A flattened portion 248 of the shaft allows the active co-operation of the rolls, while the remaining cylindrical periphery cams the arm and roll 226 away from the roll 224. During the delivery of the web to the cage, the knife 220 will occupy the position appearing in Fig. 4 of the drawings. When a fresh coil of the shell-material is to be joined to the advancing portion of the old coil, the operator throws off the feed at the rolls 224, 226 and, removing the pin 204 to give access to the web, grasps the portion above the leger-blade 222, the operating mechanisms of the apparatus drawing at this time from the excess-supply in the cage. Then swinging in the blade 220 into co-operation with the leger-blade, he severs the web and connects its forward portion by the adhesive-strip to the new coil of shell-material, as has already been described. The connection having been accomplished, the roll 226 is restored to its feeding relation.

Between the various operating mechanisms, the constituents of the web are kept in the desired path transversely by opposite edge-guides or gages 250, 250. A typical arrangement which may serve in practically all cases is illustrated in Figs. 13 and 14. These edge-guides are furnished by channel-bars with the open sides turned toward each other. The guide-bars are attached by pairs of lugs 252, 252 to transverse, horizontal supporting and adjusting bars 254 and 256 by slot-and-screw connections 258, and pass clear of the top of the frame member 260. The connections 258 allow the spacing between the guide-bars 250 to be altered to correspond to the width of the webs being operated upon. The bar 254 is arranged at one extremity to slide upon a frame member, while at the other it has a cylindrical extension 262 surrounded by a sleeve 264 threaded into a bracket 266. The sleeve lies between the end of the bar and a collar 268 pinned to its extension. When the sleeve is rotated by a knurled flange which projects from it, its travel through the bracket correspondingly shifts the bar. The forward supporting bar 256 is guided at its extremities by extensions 270 sliding in the frame, and rests upon, or moves in close proximity to, a similarly guided bar 272. The cylindrical guide-portions of the bars 256 and 272 are shown as passing through openings in brackets 273 attached to the member 260 by slot-and-screw connections 275. By these connections, the forward extremities of the guides 250 may be adjusted vertically, turning about the extensions 262 as pivots, and thus the inclination of said guides altered, and so the angle of approach of the webs to the succeeding mechanism. The bars 256 and 272 are connected to each other by a collar 274 threaded upon an extension of the former and turning in a slot 276 in the latter. An inclined bar 278 ties the bar 254 to the bar 272. Therefore, when the first of these is adjusted transversely by its sleeve 264, the second will be correspondingly moved, carrying with it the bar 256 by virtue of the connection 274, 276. By this means, both guides are adjusted simultaneously and bodily across the apparatus to aline the web or webs with the directly associated operating mechanisms. I have also found it desirable to sometimes adjust transversely the forward ends only of the guides. This may be utilized to compensate for a tendency of the web to run out of line, due to its longitudinal curvature or differences in thickness between its edges. This adjustment is effected by the collar 274, rotation of which shifts the bar 256 over the bar 272. The spring of the metal forming the guides allows such a bending of said guides, while their rear extremities upon the bar 254 remain at rest.

Figure 8:
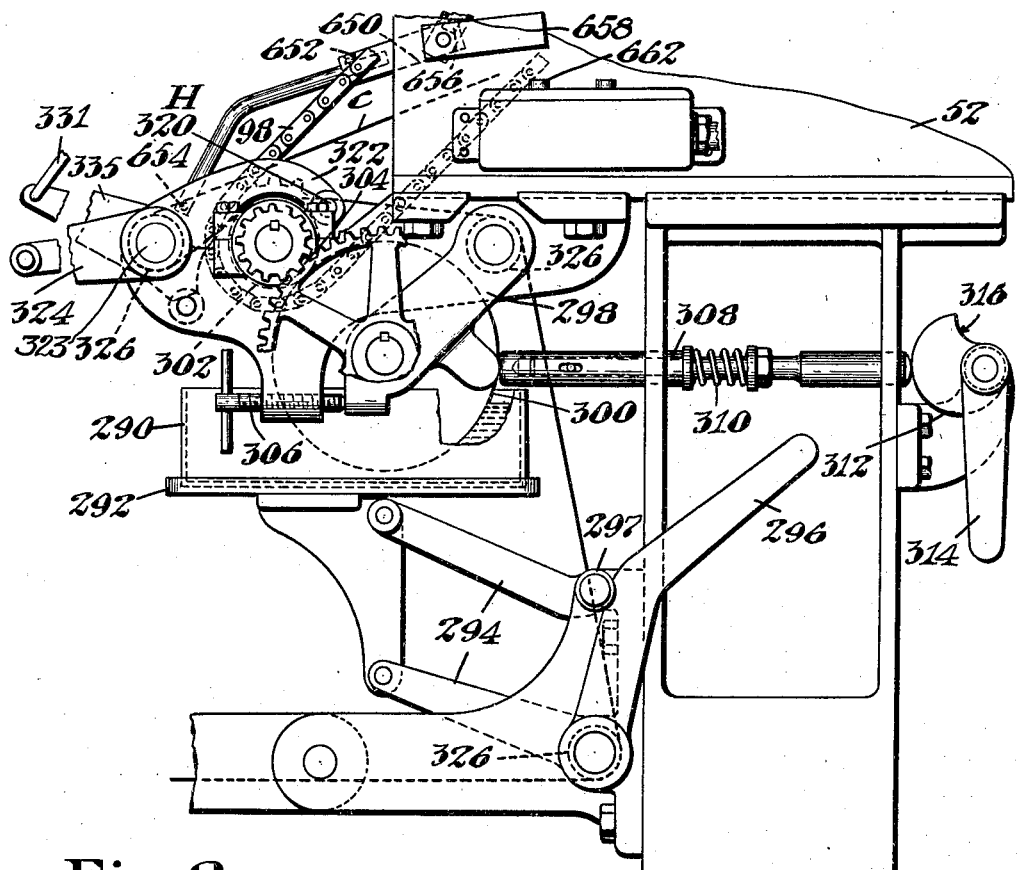
Fig. 8 shows in enlarged side elevation one of the gluing mechanisms.
Figure 9:
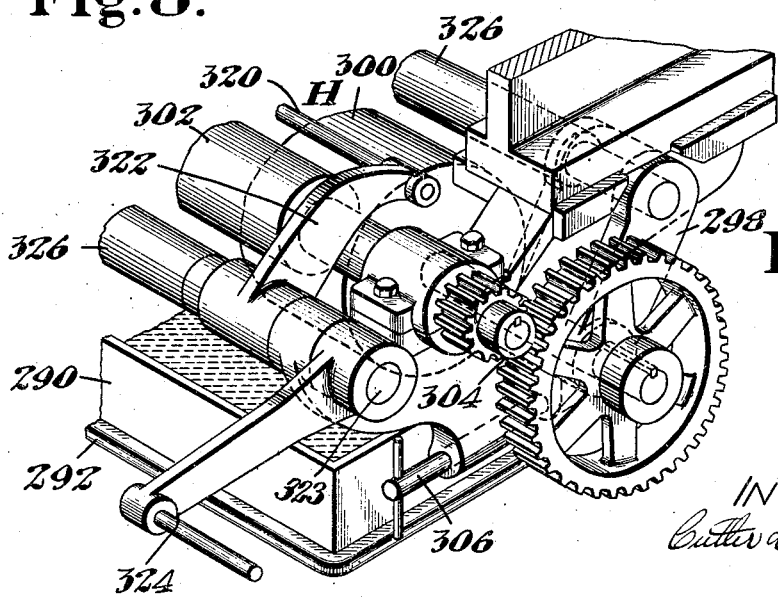
Fig. 9 is a perspective view of one side of such mechanism.

The gluing mechanisms H, J and P, which coat respectively the lining-material c, the stay-material e and the cover-material d, so closely resemble one another that it will be only necessary to describe one in detail, the mechanism H being shown in Figs. 8 and 9. A glue-receptacle 290 rests upon a platform 292, arranged to be lowered and raised by the operator, for cleaning and filling the receptacle, by pivoted arms 294, 294 connected to the platform to give a parallel motion. The platform is actuated by a hand-lever 296 attached to a spindle to which one pair of arms is connected. It may be latched in a raised position by engagement with the hand-lever of a sleeve 297, sliding upon the pivot-spindle of one of the pairs of arms 294 and movable into and out of the path of the lever. Pivoted at opposite sides of the receptacle by a transverse spindle to which they are secured are opposite arms 298, these arms furnishing, at their lower extremities, bearings upon which rotates a supply-roll 300 dipping in the glue in the receptacle. Receiving the adhesive from the supply-roll, and delivering, in turn, to the web of material traveling in contact with it, is an applying roll 302 journaled in the frame. The roll 302 is driven by the sprocket-gearing 98, in the present instance from the edge-cutting mechanism G. It, in turn, rotates the roll 300, which is of greater diameter, through spur-gearing 304, said roll 300 having a considerably less peripheral speed than its companion, so it will not deliver an excessive quantity of glue. The spacing between rolls, and therefore the amount of glue delivered to the applying roll, may be altered by adjustable stop-screws 306, against which the arms 298 are forced yieldably by expansible rods 308 arranged to slide in the frame. Each rod is in sections, with an associated spring 310, which urges one section of the rod against the arm. The other rod-section abuts against a cam 312 rotatable by a hand-lever 314. As illustrated, a high or projecting portion of the cam holds the rod in, so its spring is effective to maintain the roll 300 forward in its glue-supplying relation pressed yieldably toward the roll 302 for all adjustments of the screws 306. This arrangement also allows a separation of the rolls if a foreign substance is carried between them. When the cam is rotated by the lever to bring a depression 316 opposite the rod, the roll 300 is free to fall away from the companion roll, pushing the rod before it. This release is utilized to facilitate the cleaning of the rolls, when the receptacle 290 has been removed. Were the apparatus stopped and the web brought to rest in contact with the applying roll, said web should be injured as a result of sticking to said roll. To prevent this, I associate with the applying roll a device for separating the material from it. Herein, this device consists of a stripper-rod 320 parallel to the axis of the applying roll and extending beneath the web, the uncoated side of which runs in contact with it. The rod is carried by a pair of arms 322 fixed to a transverse spindle 323 rotatable in the frame. A hand-crank 324 secured to the spindle provides for turning it and for the consequent lifting of the web clear of the roll. Normally, the tension of the traveling material maintains the stripper-rod 320 depressed and ineffective; but after the operator has lowered the crank and thus lifted the rod, the web being now stationary, the weight of the crank and resistance of the spindle to rotation is sufficient to continue to hold the web out of contact with the applying roll after the crank has been released. The web being again started, its pull returns the rod to normal. To guide the web into and out of the gluing mechanism and obtain the necessary arc of contact with the periphery of the applying roll, the structure is simplified by utilizing the spindles which serve other purposes, surrounding them, if desired, with rolls 326 to reduce the friction of the web. Such guiding means is illustrated as furnished by the spindles of the arms 294, 298 and 322.

Between the gluing mechanism H for the lining-material, just described, and the mechanisms J and P, which respectively coat the stay- and cover-material, there are chiefly unessential differences. In the mechanisms J and P (Figs. 2, 3 and 15), the expansible actuating means for the supply-rolls are operated by bell-crank-levers 327, instead of by cams. Their lever-arms 328, for operating the stripper-rods 320 to remove the webs from engagement with the applying rolls, extend upwardly and have turning freely upon these fulcra arms 337 which are joined by a connecting-rod 329, a rod 331 also joining the arm 337 of the mechanism J to an arm 335 rotatable about the spindle 323 of crank-arm 324 of the mechanism H. When these intermediate connections 329 and 331 are employed, they are preferably so arranged that a single act on the part of the operator will cause the webs at all three gluing mechanisms to be simultaneously removed from contact with their glue-applying rolls, or that any one of said mechanisms may be independently controlled. To this end, each of the arms 324 and 328 has a lateral projection 333, with which contacts either an arm 335 at the mechanism H or one of the arms 337 at the mechanisms J and P. By moving the rod 329 to the left (Fig. 2) or the rod 331 down, the operator may, even if not stationed at the gluing mechanisms, carry the members 335 and 337 against the projections 333 to actuate all the stripper-rods. If the removal of the material from but one of the applying rolls 302 is desired, this may be accomplished by movement of the chosen arm 324 or 328, the projection thereon traveling away from the associated arm and leaving the stripper-rods of the other mechanisms unaffected.

The first operation performed upon the shell-material b by the major mechanisms is that of producing, in the opposite edges of those portions of the blank which are to give the corner-laps, the spaces at q to receive the turned-in end-wing-extensions m. The mechanism G for this purpose is shown in detail in Figs. 18 to 21, inclusive. Mounted and driven, as already described, and located just in advance of the accumulator F, is a lower abutment and scrap-ejecting roll 330 and an upper cutting roll 332. Cylindrical abutment-collars 334, 334, one for each side of the web, oppose segmental cutters 336, 336, the form of which is best illustrated in Fig. 20. These members co-operate for each rotation of the rolls to completely sever the pieces of shell-material at q from the adjacent ends of two blanks, which are at this time connected in the web. During this operation, the central portion of the web is supported, substantially in the operating plane in which the knives and abutment-collars meet, by a cylindrical enlargement 338 of the roll 330.

To insure the removal of the detached scrap from the web at predetermined points, without danger of it being carried into the apparatus, there is associated at each knife or cutter 336 and abutment-surface 334, a scrap-retaining finger 340. This finger is pivoted upon the roll 330 and has a reduced scrap-engaging end urged toward the surface 334 and against the material at q by a spring 342 seated in a depression of the roll 330. Until the web-area at q reaches the knife and finger, the latter is held away from the web by a stationary cam 344 projecting from the frame and engaging the outer surface of a tail-portion 346 of the finger. At the time the piece at q is cut, the finger leaves the upper extremity of the cam and, thus released, is forced by its spring into engagement with the scrap. This is held during the descent of the finger with the roll, pulling the cut piece positively from the web; but as the finger begins to rise, the tail strikes the lower end of the cam, withdrawing the reduced end of the finger from the surface 334 and allowing the scrap to fall into a receptacle beneath the apparatus.

It is important that the knives 336 and the areas 334 opposite to them shall not shift angularly relatively to each other. This is true because the action of the knife upon the material indents the abutment-surface, and, were the opposite members to get out of registration as a result of backlash in the driving gearing 90 and 96, the cutting effect would lack uniformity along the knife-edges. I avoid this by taking up the backlash by brake mechanism z applied to the upper roll 332. It is shown in Fig. 21 as including opposite blocks 350, 350 bearing upon the periphery of a drum 354 fast upon the shaft of the roll 332. The blocks are held in the proper relation by the pair of rods 356, 356 passing through openings in them on opposite sides of the drum, springs 358 surrounding the rods and causing the frictional engagement of the blocks with said drum. To hold the brake from rotation, a projection on one of the blocks may engage a cross-rod 360 upon the frame. This brake mechanism z may be applied to any of the cutting mechanisms or elsewhere, when desired, to maintain a definite angular relation between the opposed rolls.

The edges of the shell-material b having been notched at q, and the faces of the lining-material c and the stays e, e glued by the mechanisms H and J, respectively, for attachment to opposite faces of the shell, they are combined under pressure at the mechanism I. This consists of a pair of peripherally continuous rolls 362, 364 (Fig. 15), the lower roll 364 being of less diameter than the upper, they being forced together and rotated as previously set forth. This combining or assembling mechanism I is also caused to so act upon the material as to correct the tendency to distortion produced by the associated blank-elements. The glued Kraft stays e, e, when they dry, contract appreciably, shortening the outer portions of the side-wings g of the blanks, the inner portions being held against change by their connection to the body f. This contraction would wrap the assembly, the covers formed from the blanks thereby being caused to bow upwardly. I counteract this effect by stretching the upper surface of the shell in the opposite direction to that in which it would be drawn by the stays. For this purpose, the web b is deflected by its guides 250 from a horizontal path between mechanisms G and I, these guides being downwardly and forwardly inclined, and passes below a guide-roll 366 journaled in bearings 367. This causes the shell-web to be wrapped about a portion of the periphery of the lower assembling roll 364 and somewhat elongated at the upper side, while the smaller roll indents or compresses its under side. The angle of approach, and consequently to some extent the amount by which the web encircles the roll 364 and the resultant stretching effect, may be changed by adjusting the bearings 367 vertically upon the frame by slot-and-screw connections 368. By the means already indicated, the guides 250 may be correspondingly adjusted.

Following the assembling operation, by which the outer margins of the stays e, e are left projecting beyond the edges of the shell-web, the webs are subjected to the action of the opposite devices K, K to fold these projecting margins against the under side of the shell. The devices K are carried at the opposite edges of the webs upon a horizontal frame or platform 369, extending transversely between housings 58. Each device has an upper retaining wall 370 (Figs. 22 and 23) mounted upon the platform by longitudinal bars 371 and brackets 372, adjustable transversely of the path of the webs by slot-and-screw connections 374. This adjusting means allows the folding devices K to be brought into correct engaging relation to the edges of the webs. Carried by and extending below each wall 370 is a folding wall 376, which turns gradually from its rear extremity, where it extends transversely in substantially the plane of the wall 370, through 180°, becoming parallel to the upper wall. At this latter point, it delivers to a channel-plate 378 screwed to said upper wall. Each stay, passing beneath the somewhat upwardly inclined entering end of the walls 370, 376, has the juncture between the shell- and stay-materials just inside the meeting line of the walls. As the lower wall shifts its relation to the upper, the stay is thereby turned, until, as it emerges at the plate 378, it is parallel to the under side of the shell-material.

Leaving the folding device, the folded-over stay-material is engaged by the pressure devices L, L. These preferably each consists of pairs of lower and upper disks 380, 382. The surfaces of the lower disks 380 which contact with the stay-webs are substantially horizontal, each of these disks being free to turn about a vertical axis in the lower portion of a stud 384 adjustable transversely of the apparatus along a slot 386 in the platform 369, so it may agree in position with the corresponding folding device K. The contact-surface of each of the upper disks 382 is formed similarly to the lower, but diverges outwardly and forwardly from its companion, a portion 388 of the stud which furnishes its journal being inclined inwardly and rearwardly. A spring 390 surrounds the hub of each disk 382, and, abutting against a nut and lock-nut 392 upon the threaded end of the stud, forces said disk against the turned-over portion of the stay, the opposite disk acting as an abutment. The action of the pairs of disks is to press the stays, to insure their adhesion to the shell, and, as they are rotated by the advance of the webs between them, the inclined disks 382 also wipe the wider upper edges of the stays inwardly, causing them to contact smoothly with the shell. This smoothing action is made effective by the peculiar inclination of the upper disk-journals. The portion of the periphery of the disk 382 which, rotated by contact of the webs, wipes inwardly across the stay to smooth it is in full engagement, but the opposite portion at the forward side of the spindle, which would exert an outward displacing tendency by its rotation, is raised above the stay and produces no disturbing effect. Between both the folding walls and the pressure-disks the webs are given the support of a central table 394, which maintains the edges in the proper plane.

With the stays e, e positioned upon and adhering to both sides of the shell-web b, they are pressed more firmly against it, and at the same time, while the glued stay-material is still moist and flaccid, each stay is plaited or forced in at its edge over the space q in the shell. This is accomplished by the mechanism L'. Referring to Figs. 25 to 28, inclusive, there is journaled in brackets 400, situated upon the housing 58 at the rear of the mechanism M, a bed-roll 402, over which the webs travel. This roll is shown as rotated in the direction indicated by the arrow in Fig. 25 by a train of gearing 404 (Fig. 2) from the lower roll of the mechanism M. Pressure is exerted upon the webs over the bed-roll by an upper idle roll 406 journaled in arms 408, 408 pivoted upon the brackets. Between the divided end-portions of each arm 408 rises a rod 410 mounted upon the corresponding bracket, each rod being surrounded by a spring 412 resting at its lower extremity against its arm and acting to urge the pressure-roll 406 down upon the webs. The force exerted is determined by the adjustment upon the rod of nuts 414, against which the upper end of the spring abuts. The rolls 402, 406 act upon the webs to produce more intimate contact of both stays and the lining-material with the shell. As the webs emerge from the rolls each stay extends outwardly from the shell over the space q in a closed loop, the sides of which are attached to the opposite faces of the shell and are connected by a curved outer portion substantially alined longitudinally of the webs with the edge of the shell. This looped stay would tend to interfere with the entrance into the space q of the corresponding end-wing-extension m, preventing the end- and side-walls of the cover from lying in a single plane at their edges and placing an undue strain upon the crease n. The stays are therefore acted upon at this point to depress them into the spaces q and to arrange said stays to increase their strength. Fulcrumed for movement horizontally on extensions from the brackets 400 are carrier members in the form of bell-crank-levers 416. These levers are at the outgoing sides of the rolls 402 and 406, and each has an end-portion 418 joined to it by slot-and-screw connections 420. Rotatable about a vertical axis upon each lever, with a rounded edge in close proximity to the bite of the rolls and in the same horizontal plane, is a thin disk 422. In this horizontal alinement, the disk is maintained by contact of its opposite peripheral margins with pairs of hardened collars 423, 423 upon the opposite ends of the rolls. The horizontal relation of the edge of the disk to the bite of the rolls may be altered by the connections 420. The opposite arm of each bell-crank from the disk has an adjustable contact-screw 424, which is forced by a spring 426 against an arm 428 pivoted upon the bracket 400, the extent of movement being limited by a stop-screw 401 carried by the frame. A projection from the arm is engaged by a cam 430 upon the shaft geared to the bed-roll 402. The contour of the cam for each disk is such that the latter is carried against the curved outer portion of the adjacent stay e, at the beginning of the space q in the shell, and held there until the opposite extremity of the space reaches the disk. Since the thin disk engages the stay close to the bite of the rolls, where it receives lateral support, the curved extremity of said stay may, with considerable accuracy, be pressed at its center into the space q, producing a double wall at each side of the groove t (Fig. 28), and to a depth determined by the adjustment of screw 424. Because, immediately after the action of the disk, the stay leaves the bite of the rolls, space is afforded above and below said stay for the plaited portion thus formed to expand. By this action, not only is the stay-material disposed within the space q so the end-wing-extension will be readily admitted, but the thickness of the outer edge of the stay will be doubled, it now consisting of four layers, instead of two. This extends by the juncture of side-wing and corner-lap, or at the corner of the set-up cover, so the structure will be greatly strengthened at points subjected to severe stresses in use. Moreover, a stay acted upon by this mechanism, is stronger than a single thickness of stay-material or even than a double U-shaped stay, because the forced-in edge having increased flaccidity provides a formation in which the applied stresses are not likely to be localized and thus cause ready rupture.

After the plaiting of the stays, the mechanism M (Figs. 29, 30 and 31) makes the U-shaped cuts p which define the ends of the slots o between the end-wings, their extensions and the corner-laps, of what are later to be succeeding blanks cut from the webs. An upper rotatable roll 436 has two enlargements or collars 438, 438, each furnishing cylindrical abutment-surfaces for pairs of cutters 440, 440 of U-form. These cutters are mounted upon a lower rotatable roll 442, which has collars 444, 444, both supporting at their peripheries portions of the advancing webs, and at their outer sides giving walls against which mounting members for the cutters are clamped. Each cutter is secured in place by a yoke 446, secured to the face of the collar at opposite sides of the cutter by slot-and-screw connections 447, giving a capacity for circumferential adjustment. The degree of projection of the cutter toward the abutment-collars 438 may be varied by screws 448 threaded axially through the cutters and abutting against the roll 442.

As the next step, at the mechanism N (Figs. 32, 33 and 34), the pairs of U-cuts p, p, are joined by straight cuts to complete the slots o, and the resulting scrap is disposed of. To produce these side-cuts, a segmental shearing plate 450 forces each section of material to be removed at one side of the web between co-operating circular knives 452, 452. Each plate 450 is carried by an upper roll or shaft 454, being directly clamped by nuts 455 against a flange upon a sleeve 456 secured to the roll. It may be retained against peripheral displacement by pins 458 projecting from the flange. The knives 452 surround a lower roll or shaft 460, being mounted between a flange upon a sleeve 462 fixed to the roll and retaining nuts 464. The knives are capable of tilting slightly upon their mounting, their central openings being sufficiently large to permit this, and are forced from each other against their retaining surfaces by a divided expansible or spring ring 466, which presses radially outward against inwardly diverging surfaces 468, 468 upon the adjacent sides of the knives. The entering end of each segment 450 is somewhat reduced laterally at 469, so it forces its way between the knives without injury to their cutting edges, said knives tilting to allow this. Effective severing contact is thus assured along the entire cutting length of the segment, against which both knives bear with uniform force throughout. This operates cleanly upon even brittle, non-tenacious stock. As the forward extremity of the segment approaches the material within the leading cut p, a projection 470 from said segment strikes this portion of the material which is to be ejected as scrap, and forces it down for contact with a curved deflecting apron 471 depending from a transversely extending rod 473. The bent-down scrap bears upon a guide-strip 472 mounted upon an adjacent housing and extending between the knives 452 forwardly and downwardly, finally emerging between them at 474. The cut-out piece is carried by the rotation of the knives along the guide, and is finally ejected, as the guide extends outwardly between said knives. The detachment of the other extremity of the strip of scrap is assured by a projection 476 at the rear of the segment, this forcing the cut piece from the webs. At all times the scrap is prevented from following the advancing webs by the deflector 471.

The printing mechanism O, and any mechanism which may be introduced at O', are not parts of the present invention and do not require further consideration here.

The assembling of the webs is now to be completed by the addition of the cover-material. This cover-web is drawn from the coil D, through the gluing mechanism P, and, coated upon its under side, is presented against the upper surface of the previously combined webs in their travel between the rolls of the mechanism Q (Fig. 2). These rolls may be of equal diameter and, like the operating surfaces of the associated rolls generally, rotate at the same peripheral speeds in opposite directions.

To give the free margins s of cover-material, folded and secured about and concealing the rough shell-material at exposed edges of the end-wings, the cover-slitting mechanism R, margin-tucking mechanism U and margin-folding and pressing mechanism V, act successively, except that there are interposed between the mechanisms R and U, folding and pressing mechanisms S and T, respectively, which act successively upon the free outer portions u of the cover-material to cause their adhesion to the under sides of the side-wings and corner-laps, imparting a finish for the exposed edges of the former.

As appears in Figs. 35 and 36, the mechanism R has a rotatable roll 480, upon which, spaced from each other, are abutment-collars 482, 482. Below, is a rotatable roll 484 carrying, in vertical alinement with members 482, 482, sectional collars 486, 486 fast upon the roll and each having clamped between its sections a segmental knife 488 operating against the opposed abutment. The relation of the circumferential extent of the cutting edge of each knife to the length of the slots which it fully enters, its angular movement with respect to the advance of the webs, and its position transversely of the webs, are such that the cover-material is severed at r in close proximity to the inner edge of the corresponding corner-lap and for nearly the full length of the slot o. The operation of the segmental knives from the under side of the material is particularly advantageous, in that each blade is capable of entering the slot in the shell b, so it may act close to the ends without cutting said shell and will be separated from the opposite abutment-collar 482 only by the paper, rather than by the additional thickness of the shell. It will therefore work without tearing the paper, as might be the case were the rolls oppositely placed.

The cover-material is sufficiently wide to extend outside the edges of the shell-web at u, and this marginal portion carries glue applied by the mechanism P. These projecting margins are turned over and secured to the shell to finish what will become the exposed edges of the side-wings. Fixed folding walls at S and pressing disks at T may be substantially the same as the previously described devices K and L, respectively, and are not illustrated in detail, but merely indicated in Fig. 3.

Contact of the slit portions s of the cover-material with the under face of the shell-material and their adhesion thereto are effected at the mechanisms U and V. Located just in advance of each pair of pressing disks T, in bearings 490, is a shaft 492 driven by sprocket-gearing 493 from the succeeding assembling mechanism W (Fig. 3). Upon this shaft are secured disks 494, 494 (Figs. 37 and 38) spaced from each other. Upon one of the side-faces of each disk is attached a tucking segment 496, of such extent and so located as to engage in its rotation the severed portion s of the cover-material and force said portion down through the slot o in the shell to a vertical position. The extent to which each segment enters the slot may be determined by adjusting the bearings 490 vertically upon the housings by means of slot-and-screw connections 498. The correct angular position of each segment, to cause it to register with the portion s of the cover-material, may be obtained by its slot-and-screw connection 500 to its disk. The edge of each segment appears as inclined downwardly and outwardly at 499. The somewhat reduced periphery is useful in dividing material which may have been imperfectly slit, and the inclination tucks effectively, pushing in out of its path the shell-web if engagement is had with this. During this tucking operation, the webs are resting at each side upon a pair of plates 501, 502 forming a part of the folding and pressing mechanism V. Each pair of plates is mounted on cross-bars 503, the plates of each pair being separated by a channel 504, into which the corresponding segment 496 enters. The tucking is accomplished in a portion of this channel parallel to the line of travel of the webs, and it is completed as the turned-down margin enters an inclined folding portion 506 of the channel, the outer wall of which is curved vertically at 508 (Fig. 39). The effect of this channel-portion 506 is generally the same as that of devices K and S, the divided portion s being gradually turned up parallel to and against the shell-material, then riding upon the upper face of the plate 501. The adhesion of the folded margins is assured by the engagement with the upper face of the combined webs of pressure means, shown in the form of pairs of rolls 512, 512 rotatable at the opposite ends of horizontal housings 514, 514. The housings are carried by an upper yieldable cross-bar 516, guided at its extremities by vertical rods 518 rising from elements of the frame. Springs 520 surround the rods to cause the bar 516 to urge the rolls toward the plates 501, 502, and against the webs. Slot-and-screw connections 522 with the bars 503 allow the lateral relation to be established between the folding plates which will give the proper width of the channel 504, 506.

All the glued areas are now in contact with their opposing surfaces, and final assembling pressure is applied by the rolls at W. These are preferably the same as the rolls Q.

There is indicated at X in Fig. 3 a mechanism for roughening the outer surface of the cover-material d over the corner-laps k, to facilitate their adhesion to the glued end-wings when the cover is set up from the blank A. This abrading means may or may not be employed, depending upon the manner in which the glue penetrates the particular cover-material entering into the composition of the blank. If its use is desirable, the arrangement disclosed in the application filed in my name in the United States Patent Office on August 20, 1928, Serial No. 300,821, is suitable for the purpose. The application on January 10, 1933, became Patent No. 1,893,554.

The longitudinal creases i, i of the blanks are produced by the mechanism Y of Figs. 40 to 43, inclusive. Journaled across the frame are a pair of lower shafts 530, 530 and a pair of upper shafts 532, 532. Formed in each shaft are two crank-portions 536 and 538 for the lower shafts, and 540 and 542 for the upper shafts. These two portions at opposite sides, or 536, 538 and 540, 542, respectively, are separated angularly about their shafts by 90°. The upper and lower crank-portions at the same side, or 536, 540 and 538, 542, respectively, are 180° apart. This gives, at opposite, or upper and lower, sides of one area which is to be creased at i, two pairs of cranks, which alternately approach into active cooperation and recede from each other. At opposite sides of the other area which is to receive a crease i, there is a like arrangement, except that the approach and recession is differently timed. The lower pairs of cranks have mounted upon them longitudinally extending carrier-bars 544 and 546, which are respectively opposed by bars 548 and 550 upon the upper cranks. Considering the lower carrier-bars, each supports an intermediate holder-bar 552 attached at its ends to the corresponding carrier-bar by slot-and-screw connections 554. The slots lie across each bar, permitting a lateral adjustment. This adjustment is facilitated by pairs of screws 555, 555 threaded through the sides of the bars and contacting at their inner extremities with the clamping screws. At opposite sides of the center of the upper face of each bar 552 are longitudinally extending depressions or slots, in which are seated the lower angular edges 557 of a pair of creasing blades 558, 558. Outside and parallel to the slots extend retaining and adjusting walls 560, 560 secured to the bar 552 by slot-and-screw connections 562. With horizontally extending angular inner portions of the walls 560 the blades 558 normally contact, and are thereby limited in their movement of separation about the edges 557 against the force of interposed springs 564. Each upper carrier-bar 548 or 550 bears a holder-bar 566 adjustably secured by slot-and-screw connections 568, similar to the already described connections 554. In a longitudinal slot in each bar 566 is secured a thin creasing blade 570, vertically alined with and adapted to enter between the opposed pairs of lower blades 558, 558. Each blade 570 is preferably supported between walls of a backing member 572, which fills laterally the slot in the holder-bar 566. This member and the blade may be secured in place by bolts 574 passing transversely through openings in them and in the walls of the bar 566 at their opposite sides. Each member 572 is backed by adjusting-screws 576 threaded through its carrier-bar. Springs 577, interposed between the ends of each member 572 and overlapping ends of its bar 566, force said member into contact with the screws when the clamping bolts 574 are released. At each side of each blade 570, upon the inner edges of the walls of the member 572, are inclined surfaces 578 converging upwardly toward the blade. In the revolution of the upper and lower cranks, considering either pair, the blades 558, 558 upon one hand, and the center blade 570 upon the other, approach, respectively, from below and above the assembled webs and, at the same time, travel with them. Therefore, when contact occurs, all the blades and webs are advancing together, and there will be no tendency to burn the material by friction resulting from relative longitudinal movement. The correct time-relation between the blades and webs is obtained by a countershaft 580 interposed between the line-shaft 92 and one of the lower crank-shafts 530, this countershaft being connected to the line-shaft by the bevel-gearing 90 and to the crank-shaft by spur-gearing 582. The usual spur-gearing 96 joins the driven lower crank-shaft to the corresponding upper shaft 532. The other pairs of cranks at the opposite extremities of the bars are rotated by said bars themselves, so the necessity of providing gearing for the second pair of crank-shafts and for correctly timing them to operate synchronously is avoided. As compared, for example, with creasing means carried by eccentrics, the crank-mounting, because of the longer throw within the same circumferential limits, gives more time for creasing contact, with greater tangential speed and less bearing-speed and friction. The cranks at right-angles and driven one from another lead to a structure which is rigid, operates accurately and runs smoothly. The rate of action of the creasing devices, with respect to the advance of the webs, is such that the successive sections of either crease $i$ formed by a set of blades overlap, insuring continuity of the crease. As each blade 570 enters between the companion blades, forcing the material before it, the creasing edges of the blades 558 urge the material against the surfaces 578, the springs 564 being compressed. The inclination of the surfaces 578 assists in directing the blades 558 toward the central blade, gathering in and pinching the material. There is thus produced by each set of blades an effective crimp- or bead-crease, which allows the material to flex readily without breaking. After the upper and lower blades have passed the centers, they separate vertically, and the lower blades are restored to their initial positions by the springs 564, they being now ready for the succeeding operation. The angular separation by 90° of the pairs of cranks 536, 540 and 538, 542 eliminates the dead-center, one pair or the other being always effective, and also causes the sets of blades to act upon the material alternately. As but one set acts at a time for the creasing operation, the remainder of the width of the material is free to be drawn laterally when it is pinched, and therefore narrowed by the action of the blades. Were the creases to be made simultaneously, undue stresses might be imposed upon the webs. The various adjustments furnished allow the dimensions of each crease and its transverse relation to be changed. The connections 562, which determine the extent of separation of the blades 558, 558, vary the width of the crease. The connections 554 allow the entire lower creasing device to be shifted transversely of the webs without disturbing the adjustment at 562. Corresponding to the adjustment 554 is that at 568 for the upper blade, establishing registration in a vertical plane. The screws 576 control the depth of the creases. Each adjusting means is simple and readily operated, and a relation of the blades may be obtained to best meet any operating condition.

For creasing the webs transversely at $j$ and $n$, the mechanism Z has two lower rolls 590, 590, and two upper rolls 592, 592, respectively alined therewith in vertical pairs (Fig. 3), each pair of rolls carrying two pairs of cooperating creasing devices extending parallel to their axes. The creases $j$ and $n$ in the blank A are so close together that it is not convenient to mount upon a single pair of creasing rolls means for producing both. I therefore divide them between two pairs of rolls, as illustrated, the two pairs of upper and lower creasing devices on one roll pair forming the crease $j$ at one extremity of the blank, and the crease $n$ at the other extremity, and those upon the other pair of rolls producing the other cross creases at the two ends of the blank. The mechanism Z is shown in detail in Figs. 44 and 45. Of the creasing devices, each of these upon the upper rolls has a blade 594, which may be formed and mounted as is each blade 570 of the longitudinal creasing mechanism Y. The lower blades 596, 596 are also formed and generally arranged as are the blades 558 of the preceding mechanism, except that a somewhat simplified mounting and adjusting means is shown. Retaining walls 598, 598 are preferably integral with a carrier-bar 600, this bar being transversely adjustable, as are the bars 552 and 566, by slot-and-screw connections at its ends. The space between the blades 596, and consequently the width of the crease made, is controlled by moving a bed-piece or holder-bar 602, engaged by the inner ends of each pair of blades, toward and from the overhanging extremities of the retaining walls. This is accomplished by screws 604 threaded into the lower roll and engaging the bed-piece. Thus, instead of adjusting the retaining walls separately, the bed-piece is shifted by a single operation to achieve the same end.

In advance of the transverse creasing mechanism Z are located the rolls X' (Fig. 46). These generally resemble the combining rolls Q and W and the supporting and feeding rolls O', but instead of being driven at the same peripheral speed as are generally the rolls of the other mechanisms which operate upon the webs, they have a somewhat higher peripheral velocity because of their slightly greater diameter. By them the entire preceding portions of the webs are subjected to a force which maintains the material uniformly tense, and insures its presentation to each mechanism in such a manner that the operations will be performed in the correct relation to previous operations.

The material emerges from the mechanism Z with all the blank-forming operations upon the webs completed. The blanks are now to be severed from the webs and delivered from the apparatus. The division of the blanks is effected by the cutting-off mechanism Y' (Fig. 46). In this, there is a lower rotatable abutment-roll 610 and an upper rotatable cutting roll 612. The roll 610 may have seated in a slot in its periphery, parallel to the axis, an anvil 614 removably retained by screws 616 threaded through the roll. With the anvil co-operates a knife 618 upon the roll 612. The lateral position of the knife and the degree of its projection from the roll may conveniently be varied by adjusting means of the same character as is employed in connection with the creasing blades 570 and 594 of the mechanisms Y and Z. For each rotation of the rolls 610 and 612, the knife 618 serves a section from the webs at $v$ midway between adjacent creases $n$, producing completed blanks of equal length. While the leading blank is still attached to the webs, its forward extremity is thrust over a portion of the periphery at 620 of a lower rotatable ejecting roll 622 of the mechanism Z' (Fig. 46), this portion 620 being of slightly less diameter than the remainder of the periphery. Above, operating in contact with the lower roll-portion of greater diameter, is a smaller rotatable roll 624. These rolls 622, 624 are driven at a somewhat higher peripheral rate than that at which the webs are advancing through the preceding mechanisms. The roll 622 may be grooved peripherally at 625, these grooves registering with the longitudinal creases $i$ of the blanks and relieving them of deforming pressure. Just as the knife 618 makes its cut, the forward edge of the blank, lying within the space between the rolls over the reduced portion 620, is engaged between the leading point 626 of the portion of the lower roll of maximum diameter and by the companion roll. Immediately, the severed blank is drawn away from the webs, as a result of the increased speed of the ejecting rolls, and its complete separation from the web-material is assured. The ejecting rolls may deliver to a conveyor (not shown), by which they are removed for setting up or storing.

Were one of the webs of material to break during its advance, it would lead to the spoiling of a number of blanks before the operator could stop the apparatus, and the broken material might become entangled in the moving elements. I have, therefore, shown means for automatically stopping the driving motor when any one of the webs accidentally parts during its travel. This permits the convenient making of a splice, without rethreading the web through the machine. The stopping mechanism for the shell-web $b$ may be associated with a comparatively long horizontal guide through which the web passes from the accumulator F to the edge-cutting mechanism G (Fig. 1). This guide includes a table 630 having, at its opposite sides, vertical edge-gages 632, between which the web runs. A weighted plate 634 may rest upon the web, pressing it toward the table and keeping it flat and correctly alined. Fulcrumed below the table is a controlling lever 636 provided with an upwardly extending contact-finger 638, entering an opening in the table and urged against the web $b$ by a weight 640 secured to the lever at the opposite side of the fulcrum. This weight is located above a stop-button 642 included in the circuit of the driving motor 101. If the shell-web separates at the incoming side of the finger during its travel, the broken forward portion will pass beyond the finger 638, freeing said finger, which will thereupon be forced by the weight 640 up through an opening in the plate 634 alined with a table-opening. In descending, the weight strikes and actuates the button 642, opening the motor-circuit to stop the apparatus. As to the means for cutting off power from the motor upon breakage of any one of the three paper-webs, such means may be associated with the corresponding gluing mechanisms and may be in all essential particulars the same. Only that controlled by the lining-web $c$ at the gluing mechanism H will be illustrated and described in detail. Referring to Figs. 1 and 8, there is fulcrumed above the mechanism H a three-armed lever 650. A downwardly and rearwardly extending arm of this lever is secured for longitudinal adjustment at 652 and carries a rod 654 lying horizontally beneath the lining-web and contacting with its uncoated side after it has passed the applying roll 302. Upon an upwardly and forwardly extending arm of the lever 650 is adjustably attached, at 656, a weight 658, and below this a lever-arm extends over a stop-button 662 governing the circuit of the motor 101. Normally, the lever is held against movement, under the influence of its weight, by the engagement of the rod 654 with the web. If, however, this web breaks, the rod is released and the weight causes the lever arm to descend, depressing the button 662 and stopping the apparatus. At the gluing mechanisms J and P for the stay-material and cover-paper respectively, it is convenient to mount the stop-buttons a substantial distance below the levers 650. Consequently, the button-actuating arms of the levers at these mechanisms appear at 660, in Figs. 2 and 15, much longer than the corresponding arm at the mechanism H, as shown in Figs. 1 and 8. While four distinct controlling means have been indicated, it will be evident that any portion or all of these may be employed, as conditions render desirable.

Having described my invention, what I claim as new and desire to secure by Letters Patent of the United States is:

1. In a blank-making apparatus, means for advancing a web of shell-material, means for removing successive portions from the margin of the web, and means for applying stay-material over the spaces thus produced.

2. In a blank-making apparatus, means for advancing a web of shell-material, means for removing successive portions from the margin of the web, and means for applying stay-material over the spaces thus produced and for simultaneously stretching the shell-material at the side to which the stay-material is applied.

3. In an apparatus for making box-blanks having corner-laps, means for advancing blank-material, means for removing portions of the outer margins of the corner-laps, and means for applying stay-material to the corner-laps over the spaces thus produced.

4. In an apparatus for making box-blanks having side-wings and corner-laps projecting from said wings, means for advancing shell-material, means for removing portions of the outer margins of the corner-laps, and means for applying stay-material to the side-wings and corner-laps over the spaces in the latter.

5. In a blank-making apparatus, means for advancing a web of shell-material, means for removing successive portions from the margin of the web, means for applying stay-material over the spaces thus produced, and means for applying cover-material over the stay-material.

6. In an apparatus for making box-blanks having side-wings and corner-laps projecting from said wings, means for advancing shell-material, means for removing portions of the outer margins of the corner-laps, means for applying stay material to the side-wings and corner-laps over the spaces in the latter, and means for applying cover-material across the shell and extending over the stay-material.

7. In a blank-making apparatus, means for ad vancing shell-material, means for attaching stay-material to marginal portions and at opposite faces of the shell-material, said stay-material being folded over the edge of the shell, and means for depressing the folded portion of the stay-material.

8. In a blank-making apparatus, means for advancing shell-material, means for attaching stay-material to marginal portions and at opposite faces of the shell-material, said stay-material being folded over the edge of the shell, and a plaiting member operating upon the folded-over portion of the stay-material.

9. In a blank-making apparatus, means for advancing shell-material, means for attaching stay-material to marginal portions and at opposite faces of the shell-material, said stay-material being folded in a loop over the edge of the shell-material, and a member engaging the center of the loop and being movable relatively thereto to depress and double the layers of the stay-material.

10. In a blank-making apparatus, means for advancing shell-material, means for attaching stay-material to marginal portions and at opposite faces of the shell-material, said stay-material being folded over the edge of the shell-material, means for depressing the folded portion of the stay-material, and means for applying cover-material over the depressed stay-material.

11. In a blank-making apparatus, means for advancing shell-material, means for attaching stay-material to marginal portions and at opposite faces of the shell-material, said stay-material being folded over the edge of the shell, a plaiting member operating upon the folded-over portion of the stay-material, and means for applying cover-material to the shell-material over the plaited stay-material.

12. In a blank-making apparatus, means for advancing a web of shell-material, means for removing successive portions from the margin of the web, means for applying stay-material over the spaces thus produced, and means for depressing the stay-material into the spaces.

13. In an apparatus for making box-blanks having corner-laps, means for advancing shell-material, means for removing portions of the outer margins of the corner-laps, means for applying stay-material to the corner-laps over the spaces thus produced, and means for plaiting the stay-material in the spaces.

14. In a blank-making apparatus, means for advancing a web of shell-material, means for removing successive portions from the margin of the web, means for applying stay-material over the spaces thus produced, means for depressing the stay-material into the spaces, and means for applying cover-material over the depressed stay-material.

15. In an apparatus for making box-blanks having corner-laps, means for advancing shell-material, means for removing portions of the outer margins of the corner-laps, means for applying stay-material to the corner-laps over the spaces thus produced, means for plaiting the stay-material in the spaces, and means for applying cover-material to the shell-material over the plaited stay-material.

16. In a blank-making apparatus, a support for a coil of shell-web, web-feeding means, revoluble knives acting upon the margin of the shell to produce successive notches therein, a support for a coil of stay-web, gluing mechanism through which the stay passes, means for delivering the glued stay to the notched margins at one face of the shell, and folding and pressing devices acting upon the stay to attach it to the opposite face.

17. In a blank-making apparatus, a support for a coil of shell-web, web-feeding means, revoluble knives acting upon the margin of the shell to produce successive notches therein, a support for a coil of stay-web, gluing mechanism through which the stay passes, means for delivering the glued stay to the notched margins at one face of the shell, folding and pressing devices acting upon the stay to attach it to the opposite face, a support for a coil of cover-web, gluing mechanism through which the cover passes, and assembling rolls acting upon the shell, stay and cover-webs.

18. In a blank-making apparatus, a support for a coil of shell-web, web-feeding means, revoluble knives acting upon the margin of the shell to produce successive notches therein longitudinally of the web, a support for a coil of stay-web, gluing mechanism through which the stay passes, means for directing the stay along the shell-web to cover the notches, and assembling rolls acting upon the shell and the glued stay.

19. In a blank-making apparatus, a support for a coil of shell-web, web-feeding means, revoluble knives acting upon the margin of the shell to produce successive notches therein, a support for a coil of stay-web, gluing mechanism through which the stay passes, and assembling rolls acting upon the shell and the glued stay, said rolls being arranged to stretch the side of the shell to which they attach the stay.

20. In a blank-making apparatus, a support for a coil of shell-web, web-feeding means, revoluble knives acting upon the margin of the shell to produce successive notches therein, a support for a coil of stay-web, gluing mechanism through which the stay passes, assembling rolls acting to attach the glued stay to one side of the shell, said rolls being arranged to stretch the side of the shell to which they attach the stay, and folding and pressing devices acting upon the stay to attach it to the opposite face of the shell.

21. In a blank-making apparatus, a support for a coil of shell-web, web-feeding means, a support for a coil of stay-web, gluing mechanism through which the stay passes, means for pressing a margin of the glued stay upon one face of the shell, devices for folding the stay over the edge of the shell and pressing it against the opposite face, and a depressing member acting upon the folded edge of the stay.

22. In a blank-making apparatus, a support for a coil of shell-web, web-feeding means, revoluble knives acting upon the margin of the shell to produce successive notches therein, a support for a coil of stay-web, gluing mechanism through which the stay passes, means for delivering the glued stay to the notched margins at one face of the shell, folding and pressing devices acting upon the stay to attach it to the opposite face of the shell, a depressing member co-operating with the folded margin of the stay, and means for moving the member into contact with that portion of the stay over the notched margin of the shell.

23. In a blank-making apparatus, means for slotting shell-material, means for applying cover-material to a face of the shell-material over the slot, means for slitting the cover-material adjacent to one edge of the slot, and means for tucking the cover-material through the slot.

24. In a blank-making apparatus, means for slotting shell-material, means for applying cover-material to a face of the shell-material over the slot, means for slitting the cover-material adjacent to one edge of the slot, means for tucking the cover-material through the slot, and means for folding the tucked portion over the opposite face of the shell-material.

25. In a blank-making apparatus, means for slotting shell-material, means for applying cover-material to a face of the shell-material over the slot, means for slitting the cover-material adjacent to one edge of the slot, means for tucking the cover-material through the slot, means for folding the tucked portion over the opposite face of the shell-material, and means for pressing the tucked and folded portion toward said opposite face.

26. In an apparatus for making blanks having end-wings, side-wings and corner-laps projecting from the side-wings, means for advancing a web of shell-material, means for slotting the shell-material to separate the corner-laps from the end-wings, means for applying a web of cover-material to a face of shell-material over the slots, means for slitting the cover-material along the slots adjacent to each of the corner-laps, and means for tucking the slitted material through the slot substantially at right angles to the shell-material.

27. In an apparatus for making blanks having end-wings, side-wings and corner-laps projecting from the side-wings, means for advancing a web of shell-material, means for slotting the shell-material to separate the corner-laps from the end-wings, means for applying a web of cover-material to a face of shell-material over the slots, means for slitting the cover-material along the slots adjacent to each of the corner-laps, means for tucking the slitted material through the slots substantially at right angles to the shell-material, and means for folding the tucked portions over the edges of the end-wings.

28. In an apparatus for making blanks having end-wings, side-wings and corner-laps projecting from the side-wings, means for advancing a web of shell-material, means for slotting the shell-material to separate the corner-laps from the end-wings, means for applying a web of glued cover-material to a face of shell-material over the slots, means for slitting the cover-material along the slots adjacent to each of the corner-laps, means for tucking the slitted material through the slots substantially at right angles to the shell-material, means for folding the tucked portion over the edges of the end-wings with the glued surfaces against said end-wings, and means for pressing the glued surfaces and end-wings together.

29. In a blank-making apparatus, means for slotting shell-material, means for applying cover-material to a face of the shell-material over slots and with marginal portions projecting outside the shell-material, means for slitting the cover-material adjacent to one edge of the slots, means for folding over the marginal portions of the cover-material and pressing them toward the opposite face of the shell-material, means for tucking the cover-material through the slots in the shell-material, and means for folding the tucked portions and pressing them toward the shell-material.

30. In an apparatus for making blanks having end-wings, side-wings and corner-laps projecting from the side-wings, means for feeding a web of shell-material, means for slotting the shell-material to separate the corner-laps from the end-wings, means for applying a web of glued cover-material to a face of the shell-material over the slots and with marginal portions projecting beyond the side-wings, means for slitting the cover-material along the slots adjacent to the corner-laps, means for folding the marginal portions of the cover-material over the side-wings and pressing them toward the opposite face of the shell-material, means for tucking the cover-material through the slots, and means for folding the tucked portions over the edges of the end-wings with the glued surfaces toward said end-wings and pressing them together.

31. In a blank-making apparatus, a support for a coil of shell-web, shell-feeding means, revoluble knives acting upon the shell to produce successive slots therein, a support for a coil of cover-web, gluing mechanism through which the cover passes, assembling rolls acting upon the shell and the glued cover, revoluble slitting knives arranged to sever the cover adjacent to one edge of each slot, and tucking segments arranged to force the slit portions through the slots.

32. In a blank-making apparatus, a support for a coil of shell-web, shell-feeding means, revoluble knives acting upon the shell to produce successive slots therein, a support for a coil of cover-web, gluing mechanism through which the cover passes, assembling rolls acting upon the shell and the glued cover, revoluble slitting knives arranged to sever the cover adjacent to one edge of each slot, tucking segments arranged to force the slit portions through the slots, and folding and pressing devices acting upon the tucked portions to attach them to the shell.

33. In a blank-making apparatus, a support for a coil of shell-web, shell-feeding means, revoluble knives acting upon the shell to produce successive slots therein, a support for a coil of cover-web, gluing mechanism through which the cover passes, assembling rolls acting to attach the glued cover to one face of the shell with marginal portions projecting beyond its edges, revoluble slitting knives arranged to sever the cover adjacent to one edge of each slot, folding and pressing devices acting upon the projecting marginal portions to attach them to the opposite face of the shell, and tucking segments arranged to force the slit portions through the slots.

34. In a blank-making apparatus, a base having opposite side-bars provided with longitudinally extending ways, housings mounted upon the ways, blocks carried by the ways and spacing the housings from one another, means extending through the housings and blocks and arranged to join them in groups, means for securing the groups to the side-bars, means for advancing a web of blank-material between the opposite groups of housings, bearings positioned between housings, and means journaled in the bearings for successively operating upon the advancing web.

35. In a blank-making apparatus, a base having opposite side-bars provided with longitudinally extending ways, housings mounted upon the ways, rods extending through the housings and joining them in groups, clamps engaging the rods and side-bars, means for advancing a web of blank-material between the opposite groups of housings, bearings positioned between housings, and means journaled in the bearings for successively operating upon the advancing web.

36. In a blank-making apparatus, a base having opposite side-bars provided with longitudinally extending ways, housings mounted upon the ways, means extending through the housings and arranged to join them in groups, means for securing the groups to the side-bars, yokes connecting adjacent housings at each side of the apparatus, means for advancing a web of blank-material between the opposite groups of housings, bearings positioned between housings, and means journaled in the bearings for successively operating upon the advancing web.

37. In a blank-making apparatus, a base having opposite side-bars provided with longitudinally extending ways, housings mounted upon the ways, means extending through the housings and arranged to join them in groups, means for securing the groups to the side-bars, yokes connecting adjacent housings at each side of the apparatus, certain of the yokes having transversely extending portions tying opposite housings together, means for advancing a web of blank-material between the opposite groups of housings, bearings positioned between housings, and means journaled in the bearings for successively operating upon the advancing web.

38. In a blank-making apparatus, a base having opposite side-bars, housings mounted upon the side-bars, yokes connecting adjacent housings at each side of the apparatus, means for advancing a web of blank-material between the opposite housings, lower bearings secured between the housings and upper bearings adjustable between said housings, pairs of rolls journaled in the lower and upper bearings for successive operation on the advancing web, a line-shaft extending longitudinally of the apparatus, gearing connecting the line-shaft and lower rolls, gearing connecting each lower roll to the corresponding upper roll, springs interposed between the bearings of certain of the pairs of rolls and adjustable spacing means between the upper bearing and corresponding yoke, and adjustable spacing members between the bearings of other pairs of rolls and springs between the upper bearings and the corresponding yokes.

39. In a blank-making apparatus, means for advancing a web of shell-material, means for supplying a web of stay-material at the edge of the shell-material, means for applying glue for the attachment of the webs, and means for stretching the shell-web at the side to which the stay-web is attached.

40. In a blank-making apparatus, means for advancing a web of shell-material, means for supplying a web of stay-material at the edge of the shell-material, means for applying glue for the attachment of the webs, assembling and pressure-rolls between which the webs pass, one of the rolls being of less diameter than the other, and means forcing one roll toward the other to indent the shell-material at the side opposite that to which the stay-web is attached.

41. In a blank-making apparatus, means for advancing a web of shell-material, means for supplying a web of stay-material at the edge of the shell-material, means for applying glue for the attachment of the webs, assembling and pressure-rolls between which the webs pass, the roll acting at the side of the shell-material opposite the stay being of less diameter than the companion roll, and means for guiding the shell-web with respect to the smaller roll in a direction causing it to partially wrap about said smaller roll.

42. In a blank-making apparatus, means for advancing a web of shell-material, means for supplying a glued web of thinner material to the shell-material, means for folding the margin of the thinner material over the edge of the shell-material, means for rubbing the thinner material from the edge of the shell inwardly, and means arranged to adjust the relation of the rubbing means to the edges of the webs.

43. In a blank-making apparatus, means for advancing a web of shell-material, means for supplying a glued web of thinner material to the shell-material, means for folding the margin of the thinner material over the edge of the shell-material and a rotatable member movable in contact with the thinner material only in a direction inwardly from the edge of the shell-material.

44. In a blank-making apparatus, means for advancing a web of shell-material, means for supplying a web of thinner material to the shell-material, means for folding the margin of the thinner material over the edge of the shell-material, and a pair of opposed pressure-disks between faces of which the edge of the shell-material carrying the thinner material travels, one of said disks being rotatable about an axis inclined to the plane of the advancing work.

45. In a blank-making apparatus, means for advancing a web of shell-material, means for supplying a web of thinner material to the shell-material, means for folding the margin of the thinner material over the edge of the shell-material, and a pair of opposed pressure-disks between faces of which the edge of the shell-material carrying the thinner material travels, one of said disks being rotatable about an axis inclined inwardly and forwardly with respect to the plane of the advancing work.

46. In a blank-making apparatus, means for advancing a web of shell-material, means for supplying a web of thinner material to the shell-material, means for folding the margin of the thinner material over the edge of the shell-material, and a pair of opposed pressure-disks between faces of which the edge of the shell-material carrying the thinner material travels, the pressure-face of one disk being substantially parallel to the faces of the webs and the face of the other disk diverging outwardly and rearwardly therefrom.

47. In a blank-making apparatus, means for advancing a web of shell-material, means for supplying a web of thinner material to the shell-material, a support along which the webs travel, a spindle projecting from the support and having an inclined outer portion, and disks rotatable about the spindle and its inclined portion and contacting with opposite faces of the webs.

48. In a blank-making apparatus, means for advancing a web of shell-material, means for supplying a web of thinner material to the shell-material, a support along which the webs travel, a spindle projecting from the support and having an inclined outer portion, means arranged to vary the position of the spindle upon the support toward and from the webs, and disks rotatable about the spindle and its inclined portion and contacting with opposite faces of the webs.

49. In a blank-making apparatus, means for advancing shell-material carrying along its edge a projecting loop of thinner material, and means contacting with the loop in its travel to depress the projecting portion.

50. In a blank-making apparatus, means for advancing shell-material carrying along its edge a projecting loop of thinner material, means contacting with the loop in its travel to depress the projecting portion, and means arranged to vary the action of the depressing means.

51. In a blank-making apparatus, means for advancing shell-material carrying along its edge a projecting loop of thinner material, and a plaiting member contacting with the loop in its travel.

52. In a blank-making apparatus, means for advancing shell-material carrying along its edge a projecting loop of thinner material, and a rotatable plaiting disk contacting with the edge of the loop.

53. In a blank-making apparatus, means for advancing shell-material carrying along its edge a projecting loop of thinner material, a plaiting member co-operating with the loop, and means for moving the plaiting member toward and from the loop.

54. In a blank-making apparatus, means for advancing shell-material carrying along its edge a projecting loop of thinner material, a plaiting member co-operating with the loop, means for moving the plaiting member toward and from the loop, and means arranged to vary the extent of movement of the member.

55. In a blank-making apparatus, means for advancing shell-material carrying along its edge a projecting loop of thinner material, a lever fulcrumed adjacent to the edge of the material, a disk rotatable upon the lever, and means for oscillating the lever to carry the disk into and out of contact with the loop.

56. In a blank-making apparatus, means for advancing shell-material carrying along its edge a projecting loop of thinner material, a lever fulcrumed adjacent to the edge of the material, a disk rotatable upon the lever, means arranged to vary the position of the disk upon the lever, and means for oscillating the lever to carry the disk into and out of contact with the loop.

57. In a blank-making apparatus, means for supplying a web of shell-material with a loop of stay-material secured to the opposite sides of its margin, a pair of pressure-rolls between which the shell and looped stay pass, and a rotatable loop-plaiting disk situated with its edge in close proximity to the bite of the rolls.

58. In a blank-making apparatus, means for supplying a web of shell-material with a loop of stay-material secured to the opposite sides of its margin, a pair of pressure-rolls between which the shell and looped stay pass, a carrier member situated at the outgoing side of the rolls, and a disk rotatable upon the carrier and contacting with the rolls at its opposite sides and with its edge arranged for engagement with the looped stay as it emerges from the bite of the rolls.

59. The method of making blanks, which consists in securing stay-material to the opposite sides of the margin of shell-material and projecting therefrom in a loop, and depressing the edge of said loop.

60. The method of making blanks, which consists in securing stay-material to the opposite sides of the margin of shell-material and projecting therefrom in a loop, and plaiting said loop to increase the thickness of the stay.

61. The method of making blanks, which consists in removing portions of the margin of a web, securing to said margin a stay extending from one side of the web to the other over the spaces formed by the removed portions, and depressing the stay into the spaces.

62. The method of making blanks, which consists in removing portions of the margin of a web, securing to said margin a stay extending over the spaces formed by the removed portions, and plaiting the stay in the spaces to form a plurality of doubled portions.

63. The method of making box-blanks having side-wings and corner-laps projecting therefrom, which consists in gluing stay-material to opposite faces of the side-wings and corner-laps, and operating upon the stay-material to increase its strength at the juncture of the side-wings and corner-laps.

64. The method of making box-blanks having side-wings and corner-laps projecting therefrom, which consists in gluing stay-material to opposite faces of the side-wings and corner-laps, and plaiting the stay-material along the corner-laps and adjacent portions of the side-wings.

65. The method of making box-blanks having side-wings and corner-laps, which consists in forming a notch in shell-material along the outer edge of each corner-lap, gluing stay-material to the opposite faces of the side-wings and corner-laps of the shell-material and extending over the notches, and depressing the stay-material into the notches.

66. In a blank-making apparatus, means for slotting shell-material, means for applying cover-material to a face of the slotted shell-material, a rotatable abutment-roll contacting with the work at the cover-paper side, and a revoluble segmental knife arranged to fully enter the slot at the opposite side of the shell, the circumferential extent of the cutting edge of the segment being substantially equal to the length of the slot, said cutting edge co-operating with the abutment to slit the paper along the slot.

67. In a blank-making apparatus, a support, means for advancing over the support a blank having a slot extending through it and with cover-material upon its face, and a member co-operating with the support to tuck the cover-material through the slot.

68. In a blank-making apparatus, spaced walls furnishing a channel, means for advancing a slotted blank having upon its face cover-material, a member operable in the channel to tuck the cover-material into the slot, and means arranged to vary the extent to which the member enters the channel.

69. In a blank-making apparatus, spaced walls furnishing a channel, means for advancing over the walls a slotted blank having upon its face cover-material, and a revoluble segment operable in the channel and arranged to tuck the cover-material into the slot.

70. In a blank-making apparatus, spaced walls furnishing a channel, means for advancing over the walls a slotted blank having upon its face cover-material, a revoluble segment operable in the channel and arranged to tuck the cover-material into the slot, and means arranged to vary the angular relation of the segment.

71. In a blank-making apparatus, a support, means for advancing over the support a slotted blank having upon its face cover-material, and a revoluble tucking segment provided with an inclined periphery contacting with the supported cover-material.

72. In a blank-making apparatus, spaced walls furnishing a channel, means for advancing a slotted blank having upon its face cover-material, a rotatable shaft, a disk fixed to the shaft, and a segment carried by the disk and arranged to tuck the cover-material through the slot into the channel.

73. In a blank-making apparatus, spaced walls furnishing a channel, means for advancing a slotted blank having upon its face cover-material, a rotatable shaft, a disk fixed to the shaft, a segment carried by the disk and arranged to tuck the cover-material through the slot into the channel, and means arranged to vary the distance between the shaft and the channel.

74. In a blank-making apparatus, spaced walls furnishing a channel, means for advancing a slotted blank having upon its face cover-material, a rotatable shaft, a disk fixed to the shaft, a segment carried by the disk and arranged to tuck the cover-material through the slot into the channel, and means arranged to vary the position of the segment circumferentially of the disk.

75. In a blank-making apparatus, spaced walls furnishing a channel, means for advancing a slotted blank having upon its face cover-material, and a member operable in the channel to tuck the cover-material into the slot, said channel having an extension arranged to fold the tucked portion.

76. In a blank-making apparatus, spaced walls furnishing a channel, means for advancing a slotted blank having upon its face cover-material, a member operable in the channel to tuck the cover-material into the slot, said channel having an extension arranged to fold the tucked portion, and means for applying pressure to the folded portion.

77. In a blank-making apparatus, means for advancing blank-material, a pair of plates spaced to form a channel, and a rotatable material-tucking member operating in the channel, there being a portion of the channel in advance of the tucking member constructed and arranged to fold the tucked material.

78. In a blank-making apparatus, means for advancing blank-material, a pair of plates spaced to form a channel, said channel having a portion parallel to the direction of advance of the material and a portion inclined thereto, and a material-tucking member operating in the parallel portion, the inclined portion being constructed and arranged to fold the tucked material.

79. In a blank-making apparatus, means for advancing blank-material, a pair of plates spaced to form a channel, a rotatable material-tucking member operating in the channel, there being a portion of the channel in advance of the tucking member constructed and arranged to fold the tucked material, and a member co-operating with the plates to press the folded portion.

80. In a blank-making apparatus, means for advancing blank-material, a pair of plates spaced to form channel, said channel having a portion parallel to the direction of advance of the material and a portion inclined thereto, a material-tucking member operating in the parallel portion, the inclined portion being constructed and arranged to fold the tucked material, and a yieldable pressure-roll co-operating with the plates at the inclined portion of the channel.

81. In a blank-making apparatus, creasing mechanism comprising two pairs of opposite crank-shafts, opposite bars mounted upon the cranks, co-operating creasing blades carried by the bars, and means for driving one pair of crank-shafts, power being transmitted to the other pair of crank-shafts wholly through the bars.

82. In a blank-making apparatus, creasing mechanism comprising two pairs of opposite crank-shafts, each shaft including two cranks separated angularly by ninety degrees, two pairs of opposite bars mounted upon the cranks, co-operating creasing blades carried by the opposite bars, and means for applying power to one pair only of crank-shafts.

83. In a blank-making apparatus, creasing mechanism comprising opposite movable supports, spaced creasing blades mounted upon one support, opposite retaining walls carried by the support outside the blades, means for urging the blades into normal contact with the retaining walls, means arranged to independently adjust each wall laterally, and a creasing blade upon the other support arranged to enter between the spaced blades.

84. In a blank-making apparatus, creasing mechanism comprising opposite rotatable shafts, opposite bars movable by the shafts, spaced creasing blades mounted upon one of the bars, opposite retaining walls carried by the bar and having portions extending over the blades, slot-and-screw connections between the walls and bar, means for urging the blades into normal contact with the retaining walls, and a creasing blade on the other bar arranged to enter between the spaced blades.

85. In a blank-making apparatus, creasing mechanism comprising opposite movable supports, spaced creasing blades mounted upon one support, opposite retaining walls carried by the support outside the blades, means for urging the blades into normal contact with the retaining walls, means arranged to independently adjust each wall laterally, means arranged to laterally adjust the walls simultaneously, and a creasing blade upon the other support arranged to enter between the spaced blades.

86. In a blank-making apparatus, creasing mechanism comprising opposite movable supports, spaced creasing blades mounted upon one support, a creasing blade upon the other support arranged to enter between the spaced blades, and means arranged to adjust the lateral relation between the spaced blades and the opposite blade and to fix them in the adjusted positions.

87. In a blank-making apparatus, creasing mechanism comprising opposite movable supports, spaced creasing blades mounted upon one support, a creasing blade upon the other support arranged to enter between the spaced blades, and means arranged to vary the lateral positions of the blades upon each support.

88. In a blank-making apparatus, creasing mechanism comprising a support, a bar carried thereon, variable connections between the bar and support, spaced creasing members mounted upon the bar, a retaining wall for each creasing member, variable connections between each wall and the bar, and opposite creasing means co-operating with the spaced members.

89. In a blank-making apparatus, a support, a bar carried thereon and provided with a longitudinal slot, a blade mounted in the slot, means arranged to adjust the projection of the blade from the slot, and means arranged to secure the blade in its adjusted position.

90. In a blank-making apparatus, a support, a bar carried thereon and provided with a longitudinal slot, a blade mounted in the slot, an adjusting screw threaded into the support and acting upon the blade, and a spring arranged to urge the blade toward the screw.

91. In a blank-making apparatus, a support, a bar carried thereon and provided with a longitudinal slot, a blade mounted in the slot, adjusting screws threaded through the support and acting upon the blade to move it in the slot, and clamping bolts extending through the bar and blade.

92. In a blank-making apparatus, creasing mechanism comprising a support, a bar carried thereon and provided with transverse slots, a blade mounted in the bar, clamping screws extending through the transverse slots of the bar into the support, and screws threaded through the bar and contacting with the opposite sides of the clamping screws.

93. In a blank-making apparatus, creasing mechanism comprising opposite movable supports, a bar carried by one support, spaced creasing blades mounted in the bar, opposite retaining walls carried by the bar and having portions extending over the blades, a bed-piece engaged by the spaced blades, means for moving the bed-piece toward and from the overhanging portions of the walls, and a creasing blade upon the other support arranged to enter between the spaced blades.

94. In a blank-making apparatus, creasing mechanism comprising opposite movable supports, a bar carried by one support, spaced creasing blades mounted in the bar, opposite retaining walls carried by the bar and having portions extending over the blades, a bed-piece engaged by the spaced blades, screws threaded into the support and acting upon the bed-piece, and a creasing blade upon the other support arranged to enter between the spaced blades.

95. In a blank-making apparatus, creasing mechanism comprising opposite movable supports, a bar carried by one support, spaced creasing blades mounted in the bar, opposite retaining walls carried by the bar and having portions extending over the blades, a bed-piece engaged by the spaced blades, screws threaded into the support and acting upon the bed-piece, a spring interposed between the spaced blades, and a creasing blade upon the other support arranged to enter between the spaced blades.

96. In a blank-making apparatus, means for advancing web-material, means for operating upon the material including creasing mechanism, blank-severing mechanism, a pair of ejecting rolls acting upon the blank after the severing mechanism, one of said rolls having a peripheral portion of reduced diameter forming a space between the rolls into which the end of the blank to be severed may be introduced, the roll-portion of greater diameter being provided with grooves registering with the creases in the blank, and means for rotating the rolls at a greater peripheral speed than the rate of travel of the material through the operating means.

97. In a blank-making apparatus, means for advancing web-material, means for operating upon the material including blank-severing mechanism, a pair of ejecting rolls acting upon the blank after the severing mechanism, one of said rolls having a peripheral portion of reduced diameter forming a space between the rolls into which the end of the blank to be severed may be introduced, and means for rotating the rolls at a greater peripheral speed than the rate of travel of the material through the operating means, the time of engagement of the leading point of the roll-portion of maximum diameter with the blank substantially coinciding with the action of the severing mechanism.

98. In a blank-making apparatus, means for supporting a coil of shell-web, means for supporting a coil of paper-web, means for advancing the webs from their coils, means for operating upon the advancing webs and including means for assembling them, a movable controlling member contacting with each advancing web prior to the action of the assembling means upon it, and connections to the members constructed and arranged to stop in the movement of either member the advance of the webs.

99. In a blank-making apparatus, means for supporting a coil of shell-web, means for supporting a coil of cover-web, means for supporting a coil of stay-web, means including an electric motor for advancing the webs, mechanism for assembling the shell-web and cover-paper, mechanism for assembling the stay-web and previously combined webs, a movable controlling member contacting with each advancing web prior to the action of the assembling mechanism upon it and being normally maintained against movement by its web, and connections to each controlling member constructed and arranged to open the circuit of the motor upon release of a member by the breaking of a web.

100. In a blank-making apparatus, a support for a web of blank-material, means for operating upon the web, means for advancing the web from the support to the operating means, a table over which the web travels in its advance, and a lever fulcrumed adjacent to the table and having at one extremity a portion normally contacting with the web upon the table, and means at the opposite extremity of the lever for stopping the advance of the web upon its breakage and the release of the contact-end of the lever.

101. In a blank-making apparatus, a support for a web of blank-material, means for operating upon the web, means for advancing the web from the support to the operating means, a table over which the web travels in its advance, said table being provided with an opening, a lever fulcrumed beneath the table and having upon one arm a contact-projection engaging the web through the opening and upon another arm a weight, and means actuated by the weight for stopping the advance of the web.

CUTLER D. KNOWLTON.